United States Patent
Mertins et al.

[11] Patent Number: 6,093,926
[45] Date of Patent: Jul. 25, 2000

[54] METHOD OF COUNTING SEEDS DISPENSED THROUGH SEED TUBES OF AN AIR SEEDING SYSTEM

[75] Inventors: Karl-Heinz O. Mertins, Fargo; Barry D. Batcheller, West Fargo; Paul R. Bramel; Jason J. Wanner, both of Fargo, all of N. Dak.

[73] Assignee: Deere & Company, Moline, Ill.

[21] Appl. No.: 09/008,631

[22] Filed: Jan. 16, 1998

[51] Int. Cl.[7] ....................................................... G01V 9/04
[52] U.S. Cl. ........................................... 250/222.1; 377/6
[58] Field of Search .................................. 250/222.2, 221, 250/223 R; 377/6–9, 28–29, 53; 221/174, 185, 211, 254, 3, 71, 25, 9

[56] References Cited

U.S. PATENT DOCUMENTS

| | | | |
|---|---|---|---|
| 3,723,989 | 3/1973 | Fathauer et al. | 250/222.2 |
| 3,828,173 | 8/1974 | Knepler | 250/239 |
| 5,847,389 | 12/1998 | Mertins et al. | 250/222.2 |
| 5,883,383 | 3/1999 | Dragne | 250/222.2 |

FOREIGN PATENT DOCUMENTS

WO96/36889  11/1996  WIPO .

OTHER PUBLICATIONS

Reid et al.; A Photoelectric Seed Counting Detector; J. agric. Engng Res.; 1976; pp. 213–215.

*Primary Examiner*—Que T. Le
*Attorney, Agent, or Firm*—Arnold International; Bruce Y. Arnold

[57] ABSTRACT

An optical particle flow monitoring system for monitoring particle flow through the primary and/or secondary tubes of an air dispensing system, such as an air seeder. The primary tubes include a particle sensor having at least one emitter lens body, which forms a substantially uniform, collimated beam which illuminates a sensing area in a seed tube in order to accurately monitor the number of particles flowing in the seed tube. In the preferred embodiment, optical fibers connect the emitter lens bodies to optical beam generating devices, and connect respective receiver lens bodies to optical beam detecting devices, with both the optical beam generating devices and the optical beam detecting devices being located remotely from the seed tubes for improved immunity to static electricity discharge. All the particles flowing in the secondary seed tubes associated with a given primary tube may be counted by a particle sensor located on the primary tube, thus greatly decreasing the number of sensors and the amount of data processing required to determine the total number of particles dispensed by the secondary tubes of the air dispensing system.

3 Claims, 17 Drawing Sheets

METHOD OF COUNTING SEEDS DISPENSED THROUGH SEED TUBES OF AN AIR SEEDING SYSTEM

BACKGROUND OF THE INVENTION

This invention relates generally to a discrete particle counter and, more particularly, to a seed monitor for counting the flow of seeds dispensed by an air seeding system through a plurality of primary seed tubes and secondary seed tubes, where the seed monitor includes an optical sensor attached to one or more of the seed tubes.

As is well understood, it is important to monitor the quantity of seeds that are being planted into a planting row, especially in a high capacity agricultural environment such as a farm where the seeds are corn seeds, soy bean seeds and the like. Planting too many seeds causes the resulting plant product to be too closely spaced together to allow for proper plant growth, thus affecting the crop yield. Planting too few seeds reduces the effective use of the planting area. For high output planting, industrial seed planters have been devised to plant a high volume of seeds relatively quickly. To ensure that the proper number of seeds are planted by the seed planters, a seed monitoring system is generally provided that counts the seeds as they are dispensed through seed tubes associated with the planter. A typical seed planter will have many seed tubes for planting a multitude of planting rows simultaneously.

One type of seed monitoring system incorporates optical devices that generate an optical beam directed across the seed tubes, and optical sensors that are sensitive to the loss of light intensity caused by seeds interfering with the optical beam. An electrical counting circuit monitors the occurrences of loss of light intensity to provide a count of the seeds. Various optical seed monitoring systems of this type are disclosed in U.S. Pat. No. 3,974,377 issued to Steffen; U.S. Pat. No. 4,555,624 issued to Steffen et al.; and U.S. Pat. No. 4,163,507 issued to Bell.

These, as well as other, optical seed monitoring systems have been inaccurate for various reasons. One inaccuracy results from the spatial nonuniformity of the optical beam that senses the seeds. Because of spatial nonuniformity, the intensity of optical rays generated by the optical devices vary, depending upon the location within the optical beam. Therefore, the ability of the optical sensor to detect the interruption of the optical beam by the seeds varies depending on the location of the seeds within the beam. Consequently, the optical sensor may not adequately detect seeds being dropped through certain locations in the seed chute.

One prior art seed monitoring system has attempted to address spatial nonuniformity of the optical beam of a seed sensor by proposing an optical device that generates a trapezoidal cross-section of an optical beam. However, the trapezoidal cross-section creates an undesirable spatial restriction for groups of seeds as they are dropped through the seed tube. U.S. Pat. No. 4,634,855 issued to Friend et al. also discloses an attempt to create an optical beam of high uniformity. However, this proposed solution is of such complexity that the feasibility for commercial success is limited.

Another drawback of the known optical seed monitoring systems is attributable to the environment in which the optical sensors are operating. Because the seed planters encounter dirt, dust and various chemicals during the planting process that may accumulate in the seed tubes, the sensors may be adversely affected because of contamination of the optical components. This situation is further exasperated in those types of optical sensors in which the optoelectronic components and/or electronic circuits of the sensor are located at, or attached to, the seed tubes. Other problems arise by attempting to protect the circuits and associated wire harness connectors from the corrosive effects due to a combination of moisture and other environmental elements.

Another drawback of the known optical seed monitoring systems occurs when the seed sensors are associated with circuitry that counts pulses when the optical beam is interrupted by the seeds. This may result in a count inaccuracy because a plurality of seeds may simultaneously traverse the optical beam and be counted as a single seed. A related problem is that the accuracy of the known optical seed monitoring systems tend to deteriorate with increasing planting speed, with higher seed populations per acre, and with small grains and seeds. These optical systems may be incapable of a sufficiently rapid response to reliably count each seed.

Another type of high volume seed planter, generally referred to as an air seeding system, is also used to dispense seeds. Typical air seeding systems include a tank or hopper that holds a quantity of seeds, fertilizer, herbicides or other appropriate particulate material that is to be evenly dispensed over a field area. A series of primary seed supply tubes are connected to the hopper through a seed metering system, and a series of secondary seed supply tubes are connected to the primary tubes through a manifold to deliver the seeds to desirable locations on the seeding system where they can be dispensed into the ground. A fan forces air through the supply tubes to provide the mechanism for delivering the seeds from the hopper to the dispensing location.

The air seeding system offers a number of advantages over the traditional seed planting system. For example, air seeding systems generally have a higher productivity in that the system allows many more rows to be simultaneously planted than the traditional seed planting system. Therefore, more acreage can be seeded at a much faster rate. Additionally, the air seeding system has a high ground clearance so that the ground does not need to be tilled or plowed prior to being planted by the air seeding system, as was necessary with the conventional seed planter. This eliminates labor, and reduces the affects of wind and water erosion.

A number of problems can occur with air seeding systems that prevent them from dispensing the seeds in a desirable manner. For example, the seed supply tubes can become disconnected, thus preventing seeds from being dispensed through the tubes. Additionally, seeds may collect within the supply tubes and cause a partial or complete blockage of the tubes, also affecting the flow of seeds through the tubes. Also, soil can enter the seed tubes at a point where the seeds are dispensed into the ground, which may cause the seed tubes to become blocked and thus prevent the appropriate number of seeds from being dispensed.

Currently available seed planter monitoring systems could be adapted for use in the known air seeding systems to monitor seed flow. However, due to such a high number of seed tubes in the air seeding system as compared with the conventional seed planter systems, this solution is generally too costly. Also, air seeding systems tend to generate more static electricity than prior art planter systems, resulting from the movement of a high number of seeds through plastic components such as air tubes at a relatively high velocity. The resulting build-up of charge can result in discharges that can readily damage sensitive electrical components of the seed monitoring system. The present invention achieves high immunity to damage from static discharge by positioning the sensitive electrical components in an environment remote from the seed tube as well as remote from the seed sensing area.

Further, conventional seed monitoring systems would be limited to being used in the secondary seed tubes, and would not be applicable to being used in the primary seed tubes. This is because the larger cross-section of the primary seed tubes cannot be adequately covered with the existing seed sensor technology available for seed planters. Therefore, it is common practice in the industry to equip only a small number of the secondary seed tubes with seed planter type sensors, which leaves a majority of seed tubes without a mechanism for monitoring seed flow.

U.S. Pat. No. 5,177,470 issued to Repas discloses a sensor device for detecting the flow of particles in an air stream that has particular use for detecting seeds in an air seeding system. This patent discloses use of a piezoelectric sensor that extends into the seed tubes. The sensor produces high frequency signals when struck by seeds flowing through the seed tubes that give an indication of the flow of seeds through the tube. A calibration system is included so that, if the seed tube becomes blocked or partially blocked, the sensor will give an indication of this blockage in a relatively short period of time.

Although different seed monitoring systems are available for monitoring seed flow in an air seeder, there is a wide area for improvements in these monitoring systems that will allow the monitoring of seed flow, including seed counting, through all of the secondary seed tubes in a cost effective manner. Further, no prior art air seeding system has attempted to monitor seed flow and count seeds at the primary seed tubes of the air seeder. It is therefore an object of the present invention to provide such an air seeder monitoring system that counts seeds and monitors seed flow at the primary and/or secondary seed tubes of an air seeder.

BRIEF SUMMARY OF THE INVENTION

In accordance with the teachings of the present invention, a seed monitoring system for monitoring seed flow in an air seeding system is disclosed. The seed monitoring system has a particular use for counting seeds that are dispensed through a plurality of primary seed tubes. In each embodiment a seed tube includes at least one emitter lens body which generates a substantially collimated, spatially uniform beam across a sensing area within the seed tube, thus allowing the accurate counting of seeds within the sensing area illuminated by that emitter lens body. The light from the sensing area may be gathered by a receiver lens body and transmitted to a remote detector via an optical fiber, or it may be detected directly by a large area detector. Where the light from the sensing areas is gathered and transmitted to remote detectors, the number of receiver lens bodies is matched to the number of transmitter lens bodies. The emitter lens body and the receiver lens body may include one or more lenses, which may be cylindrical, spherical or aspherical, and may include folding optics. Where sensing is performed at the primary seed tubes, the diameter of the primary seed tubes determines the number of emitter lens bodies that are needed at each tube in order to form a substantially collimated, spatially uniform beam across the entire diameter of the tube. Where large area detectors are used to sense the amount of light flux received from the seed sensing areas, output cables from the large area detectors should be shielded so as to protect against static discharges.

Each of the primary seed tubes may feed a plurality of secondary seed tubes through a secondary manifold. In the preferred embodiment, each emitter lens body is remotely connected to a beam generating device via an emitter optical fiber and each receiver lens body is remotely connected to a detecting device via a receiver optical fiber. This enables all the electrical components that are subject to harm from static discharges to be located remotely from the seed tubes. Specialized algorithms are used to determine the flow of seeds being dispensed through the seed tubes based on the light transmitted through the seed tubes from the emitter lens body to either a receiver lens body or a large area detector.

Additional objects, advantages and features of the present invention will become apparent from the following description and appended claims, taken in conjunction with the accompanying drawings.

BRIEF DESCRIPTION OF THE DRAWINGS

FIG. 15 is a flowchart diagram depicting an overview of what is termed herein as the Main Loop routine for the air seeder seed counting software;

FIG. 16 is a flowchart diagram of a Count Seeds subroutine that is called by the Main Loop routine;

FIG. 17 is a flowchart diagram of a Process Event subroutine that is called by the Main Loop routine;

FIG. 18 is a flowchart diagram of a Process Averages subroutine that is called by the Main Loop routine;

FIG. 19 is a flowchart diagram of a Process Event Width subroutine that is called by the Main Loop routine;

FIG. 20 is a flowchart diagram of an Adjust Offset subroutine that is called by the Main Loop routine;

FIG. 21 is a flowchart diagram of an Adjust LED Output subroutine that is called by the Main Loop routine; and FIG. 22 is a flowchart diagram of an Algorithm Adjust subroutine that is called by the Main Loop routine.

DETAILED DESCRIPTION

The following description of the preferred embodiments, directed to an optical apparatus and method of counting seeds dispensed through seed tubes of an air seeder is merely exemplary in nature, and is in no way intended to limit the invention or its applications or uses.

Figure 1:
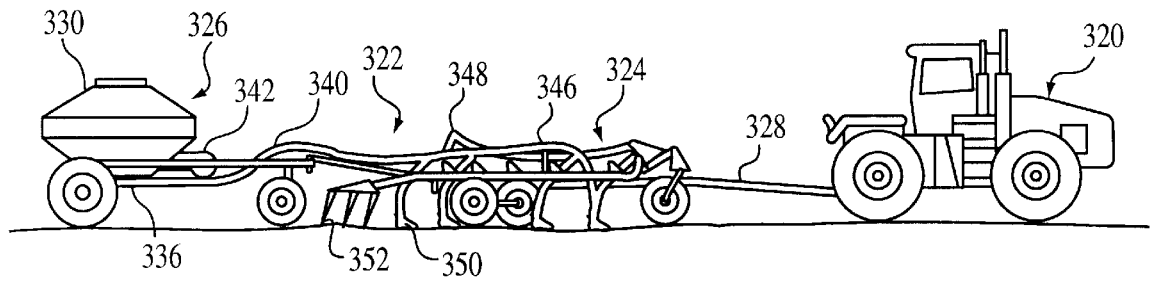
FIG. 1 is a side view of a tractor towing an air seeding system including a seed monitoring system (not illustrated in FIG. 1) according to an embodiment of the present invention.

FIG. 1 shows a side view of a tractor 320 intended to represent various types of farm tractors that perform various tasks in a high volume agricultural environment as may be present on a farm. In the depiction of FIG. 1, the tractor 320 is towing an air seeding system 322, including a tool bar 324 and an air cart 326 using a tow bar 328. The air seeding system 322 can be any air seeding system known in the art, such as the 730 Air Disk Drill, 735 Air Seeder and 737 Air Hoe Drill, all available from Deere & Company. The tool bar 324 creates multiple parallel furrows in the soil of a field area to be planted, dispenses a controlled quantity of spaced-apart seeds into the furrows, and then covers the furrows in a manner that allows the seeds to germinate and become plants. Known air seeding systems of the type of the air seeding system 322 can simultaneously plant up to ninety-six rows of seeds. The configuration of the tool bar 324 and the air cart 326 can be reversed in that the tractor can tow the air cart 326 and the air cart 326 can tow the tool bar 324.

Figure 2:
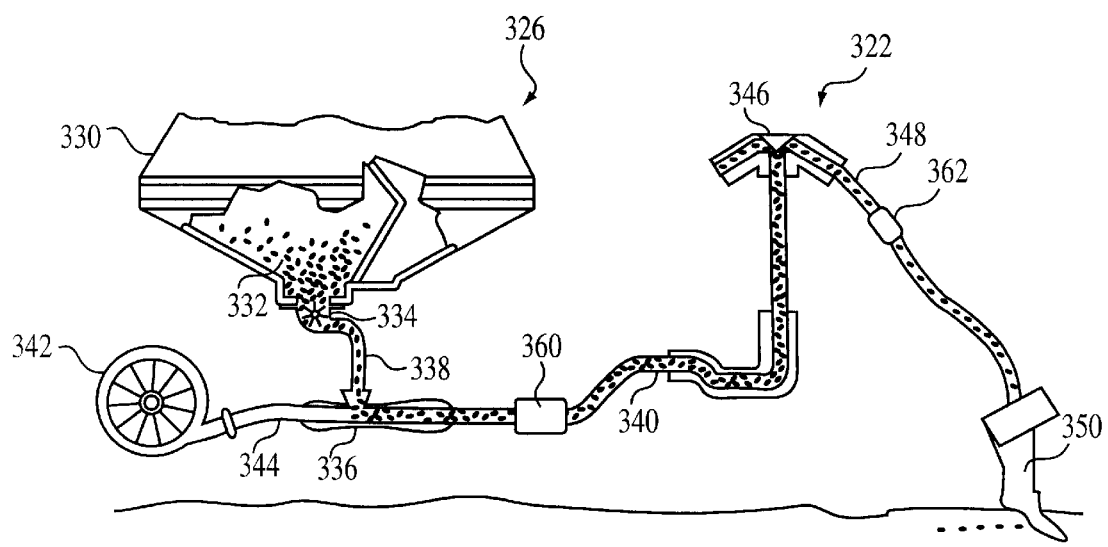
FIG. 2 is a cut-away side plan view of the seed monitoring system of the invention in association with the air seeding system.

FIG. 2 shows a cut-away side view of a portion of the air seeding system 322. The air cart 326 includes a hopper 330 that holds a quantity of particulate matter to be dispensed by the air seeding system 322. The hopper 330 can hold any particles suitable for the purposes described herein, such as various grains, seeds, fertilizers, herbicides, etc. For purposes of the present discussion, the air seeding system 320 will be described as dispensing seeds 332 of any suitable type. The flow of seeds 332 from the hopper 330 is controlled by a rotary metering system 334. The controlled flow of seeds 332 from the metering system 334 distributes the seeds 332 into a primary manifold 336 through a suitable conduit 338. A plurality of primary seed tubes 340, one of which is shown in FIG. 2, are connected to the primary manifold 336 to receive the flow of seeds 332 from the hopper 330. For the embodiment of the air seeding system that seeds ninety-six rows, there would be eight primary tubes 340.

A fan 342 is connected to the primary manifold 336 by a hose 344. The fan 342 provides air pressure to the primary manifold 336 so as to cause the seeds 332 to move through the primary manifold 336 into the primary seed tubes 340 under air pressure. Each primary seed tube 340 is connected to a separate secondary manifold 346. A plurality of secondary seed tubes 348 are connected to each of the secondary manifolds 346. In the embodiment being discussed herein, there are twelve secondary seed tubes 348 connected to each secondary manifold 346. Each secondary seed tube 348 is connected to an opener 350. The opener 350 is a blade device that creates furrows in the soil being planted from the motion of the tool bar 324 such that the seeds 332 are dispensed from the opener 350 at the appropriate depth into the soil. Ground closers 352 then close the furrows to cover the seeds with soil.

A primary sensor 360 is connected to each primary seed tube 340 at any appropriate location to monitor the flow of seeds 332 through the primary seed tubes 340 to ensure that the seeding system 322 is dispensing seeds as intended. Likewise, a secondary sensor 362 is attached to each secondary seed tube 348 to monitor the seed flow through the secondary seed tubes 348. In one embodiment, only the primary sensors 360 are used so as to provide a measurement of the seed flow in the air seeding system 322 that reduces the total number of sensors to eight so as to provide a cost effective system that allows total seed counting capabilities. As will be described in detail below, the primary sensor 360 and the secondary sensors 362 include various optical emitters and receivers, and associated fiber-optic cables in order to monitor the flow of seeds through the primary seed tubes 340 and the secondary seed tubes 348.

Figure 3:
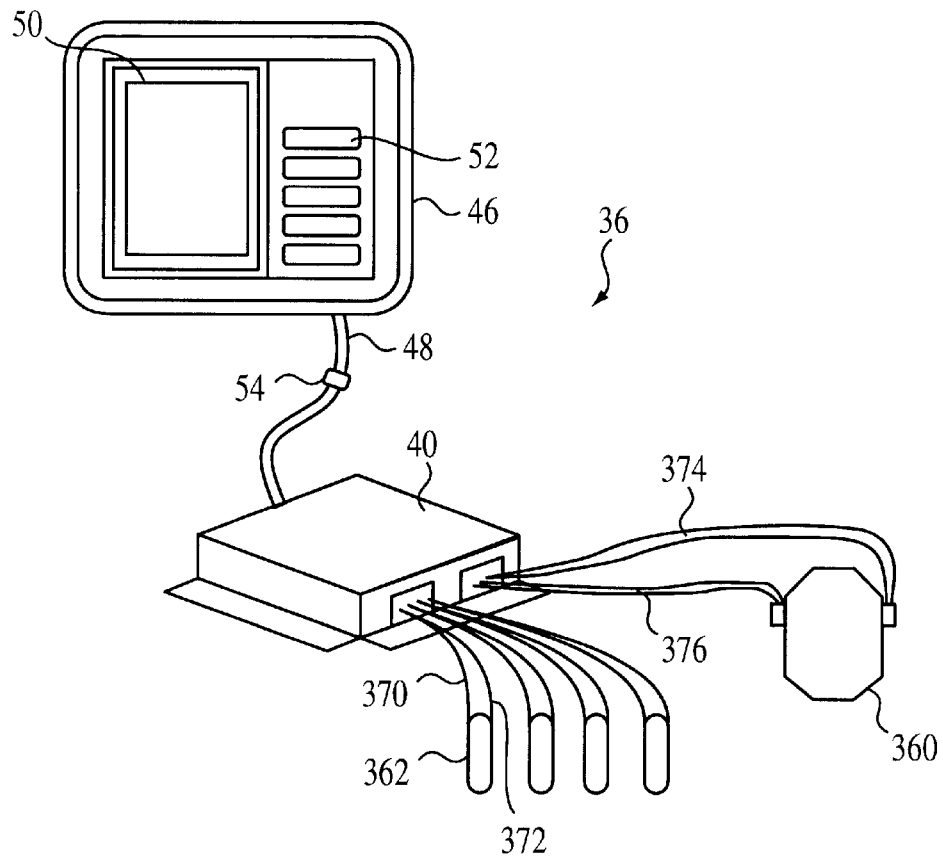
FIG. 3 is a general overview depicting the air seed monitoring system of the present invention separated from the air seeding system of FIG. 1.

As shown in FIG. 3, each of a plurality of the secondary sensors 362 are connected to a sensing module 40 by a transmitting optical fiber 370 and a detecting optical fiber 372. Because of the large diameter of primary seed tubes, in one embodiment, the primary sensor 360 includes four separate emitting lens bodies and four separate receiving lens bodies. Therefore, the primary sensor 360 includes four transmitting optical fibers 374 and four receiving optical fibers 376. Of course, any actual operational seed monitoring system 36 will have all of the necessary primary sensors 360 and secondary sensors 362 attached to the sensing module 40. As will be discussed in greater detail below, the seed monitoring system 36 includes at least one sensor, such as primary sensor 360 or secondary sensor 362 that emits an optical beam across a sensing area so that, as the seeds 332 pass through the sensing area, they obscure a portion of a substantially collimated and spatially uniform optical sensing beam to cause a change in optical flux of the sensing beam that is indicative of the size and quantity of the seeds 332. The sensing module 40 includes a radiation source and detector and is positioned remote from the sensing area. This enables the sensors 360, 362 to be highly immune to static discharges which tend to occur from the seed tubes due to the motion of the air-driven particles. As a possible, but not preferred, alternative to using a receiver lens body to collect the light onto the end of an optical fiber which transmits the light to a detector that is remotely located from the sensing area, a large area detector may be used to collect the light from the seed sensing area directly. This has a disadvantage, however, in that all of the electronics of the seed monitoring system are no longer positioned remote from the seed tubes and thus shielding is required of the outputs of the large area detectors to protect against induced electromagnetic fields caused by static discharges from the seed tubes.

Figure 4:
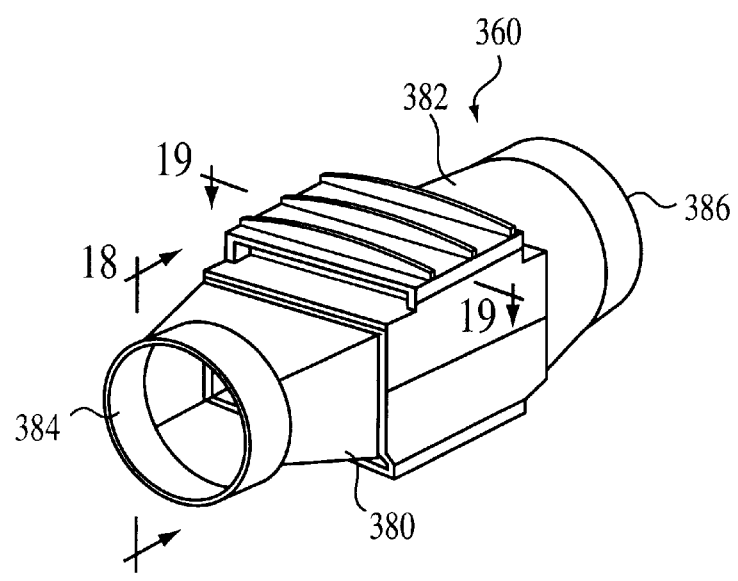
FIG. 4 is a perspective view of a primary sensor of FIG. 3 separated from a primary seed tube.

FIG. 4 shows a perspective view of the primary sensor 360 separated from the primary seed tube 340. The primary sensor 360 defines a plastic housing member formed from a first housing half 380 and a second housing half 382. In one embodiment, the first and second housing halves 380 and 382 are separately molded, and then later secured together by ultrasonic welding, glue or the like. The first and second housing halves 380 and 382 have the shape as shown in order to conform with the primary seed tube 340 in an efficient manner. Of course, other shapes may be equally effective. The primary sensor 360 includes openings 384 and 386 at each end in order to accept the primary seed tube 340. The primary seed tube 340 is attached to the primary sensor 360 by any suitable mechanism, such as hose clamps, glue, etc.

Figure 5:
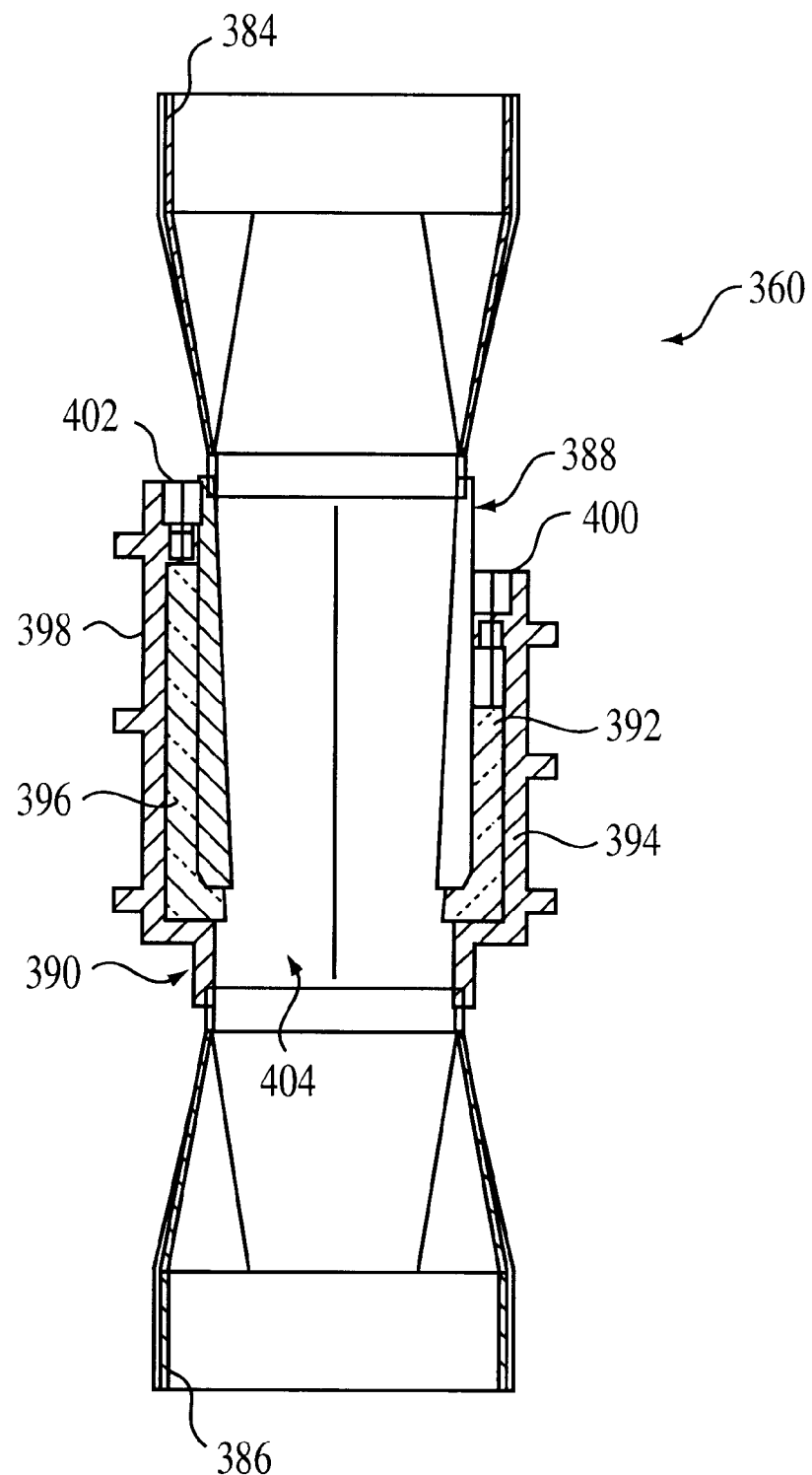
FIG. 5 is a sectional view of a primary sensor along line 18—18 of FIG. 4 that exposes an emitter lens body and a receiver lens body within the primary sensor.

In FIG. 5, a cross-sectional side view, through line 18—18 in FIG. 4, of the primary sensor 360 is depicted to show a separation of the primary sensor 360 into an emitter side 388 and a receiver side 390. The emitter side 388 includes an emitter lens body 392 secured within an emitter housing 394. Likewise, the receiver side 390 includes a receiver lens body 396 secured within a receiver housing 398. The emitter housing 394 includes an opening 400 formed to accept a transmission optical fiber (not shown) and the receiver housing 398 includes an opening 402 configured to accept a receiver optical fiber (not shown). An optical beam received by the emitter lens body 392 from the transmitting optical fiber is transmitted across a sensing area 404 to be received by the receiver lens body 396. The light received by the receiver lens body 396 is then transmitted by the receiver optical fiber back to the sensing module 40, as discussed above. As particles, such as seeds 332 pass through a primary seed tube 340, they obscure a portion of a collimated optical sensing beam to cause a change in optical flux of the sensing beam that is indicative of the size and quantity of the seeds 332. Sensing module 40 includes a radiation source and detector and is remotely positioned from the seed tubes and the sensing areas. This enables the sensing module 40 to be highly immune to static discharges which are prone to occur near the sensing areas due to the flow of particles at relatively high velocity through the seed tubes.

Figure 6:
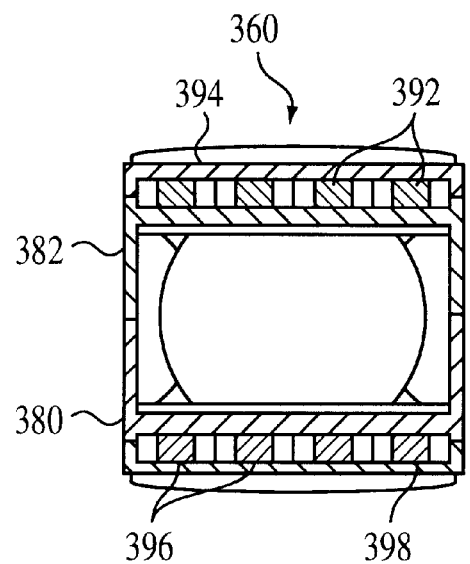
FIG. 6 is a cut-away view of a primary sensor along line 19—19 of FIG. 4.

FIG. 6 shows a cross-sectional view of the primary sensor 360 through line 19—19 of FIG. 4. Because the primary seed tube 340 must provide a larger volume of seeds to provide the necessary seed flow to the secondary seed tubes 348, the diameter of the primary seed tube 340 must be relatively large. Therefore, according to an embodiment of the present invention, the primary sensor 360 includes four emitter lens bodies 392 and four receiver lens bodies 396 within the emitter housing 394 and the receiver housing 398, respectively. Of course, more or fewer emitter lens bodies and receiver lens bodies can be used depending on the sensitivity desired and the size of the seed tube used.

Figure 7A:
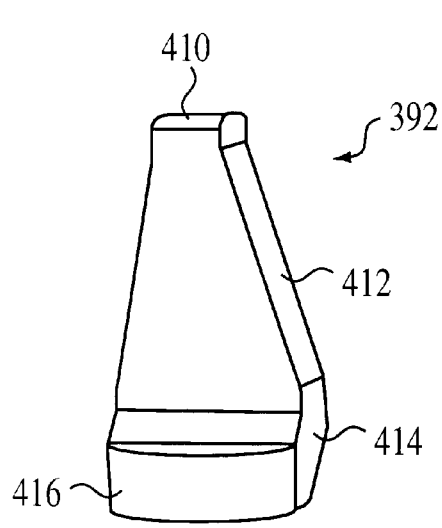
FIG. 7(a) is a perspective view of an emitter lens body.

FIGS. 7(a) shows a perspective view of the emitter lens body 392. Particularly, the emitter lens body 392 includes an upper cylindrical lens 410 positioned on a triangular-shaped vertical body portion 412. A 45 degree prism 414, serving as folding optics, is connected to the vertical body portion 412 and an aspherical lens 416 as shown. Optical radiation that enters the upper cylindrical lens 410 is emitted by the aspherical lens 416 to cross the sensing area 404 (FIG. 5).

Figure 7B:
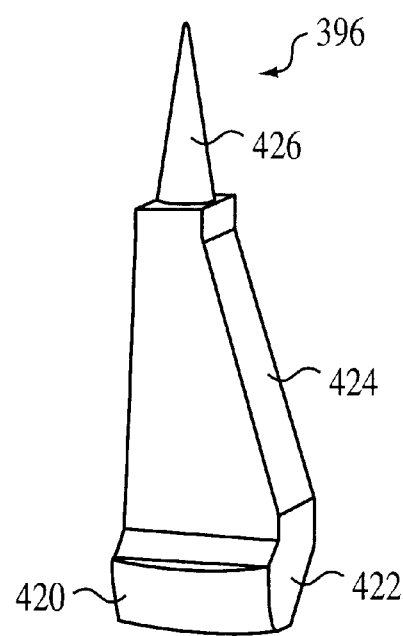
FIG. 7(b) is a perspective view of a receiver lens body, as used in the preferred embodiment of the invention.
Figure 8:
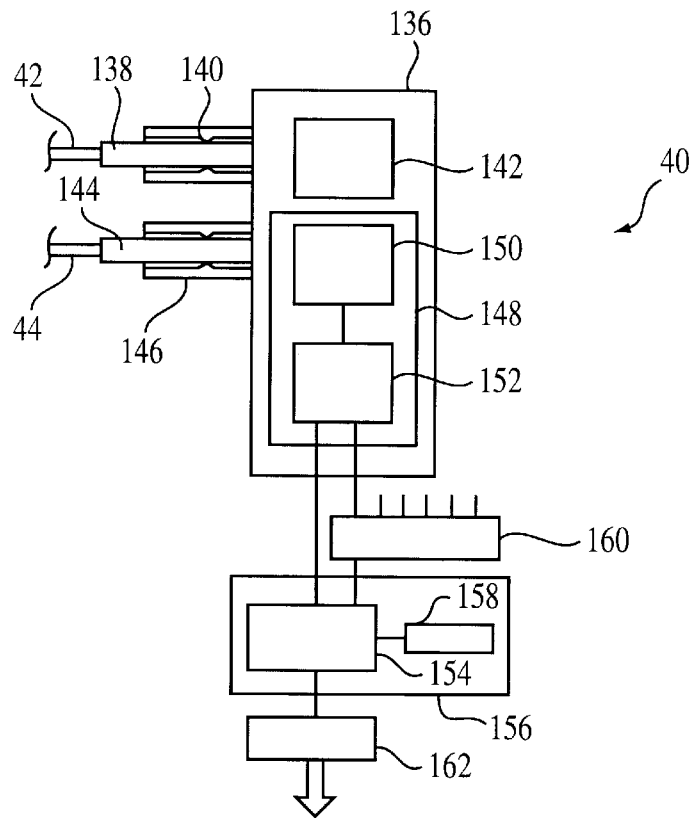
FIG. 8 is a block diagram depiction of the sensing module that electrically monitors and counts the seeds.

FIGS. 7(b) shows a perspective view of the receiver lens body 396. Light traveling across the sensing area 404 is received by a spherical lens 420, and is folded by a 45 degree prism 422 so as to be directed into a triangular-shaped vertical body portion 424. The light transmitting through the vertical body portion 424 enters a light concentrator 426 that concentrates the light into a narrow region to be sent through the receiving optical fiber, FIG. 8 shows a block diagram of the components of a seed monitoring system 36 (FIG. 3) of the preferred embodiment of the invention. A sensor (not illustrated), such as a primary sensor 360 or a secondary sensor 362, is connected to the sensing module 40 by optical fiber light conductors 42 and 44. The sensing module 40 shows a single sensor channel of the seed monitoring system 36. The optical fiber light conductor 42 includes an optical tip portion 138 that is secured to a sensor channel 136 by an optical fiber connector 140 relative to a radiation source 142. The radiation source 142 can be any applicable light emitting diode (LED) or laser diode suitable for the purposes described herein. The light conductor 44 includes an optical tip portion 144 that is secured to the sensor channel 136 by an optical fiber connector 146 relative to a radiation detector 148. The radiation detector 148 may comprise a photo diode array 150 and a voltage/frequency converter 152. The associated connectors 140 and 146, radiation source, and detector 148 can be light-link emitters available from Siemens Corporation or the TSL230 available from Texas Instruments. The detector 148 can also be an analog type detector within the scope of the invention.

The signal output from the converter 152 of each channel is applied directly to a signal processing unit 154 of a micro-controller system 156 (termed hereinafter "system 156") including a memory 158. A control line (for signal gain and sensitivity) from the converter 152 is applied to a multiplexer 160 that multiplexes all the control lines from all the different channels. An output from the multiplexer 160 is applied to the signal processing unit 154. A signal from the signal processing unit 154 is applied to the converter 152 so as to adjust the sensitivity of the detector 148 to allow for compensation for varying base line levels of radiation intensity. An output of the signal processing unit 154 is applied to a serial communication link 162 that is in connection with the operator terminal 46 (FIG. 3). The sensor channel 136, the micro-controller system 156, the multiplexer 160 and the link 162 would be included as part of the sensing module 40, discussed above.

The radiation detector 148 has a variable sensitivity which is controllable, thereby enabling compensation for what would otherwise be changes in output level over time when no object is passing through the radiation beam 170 in the sensing area. The voltage/frequency converter 152 receives a voltage representation of the optical intensity of the radiation beam 170 from the radiation detector 148. The voltage/frequency converter 152 generates a square-wave pulse signal, where the period of the square-wave is representative of the intensity of the radiation beam received. The square-wave pulse signal is applied to the signal processing unit 154 as a square-wave input. The signal processing unit 154 measures the period of the square-wave pulse signal by measuring the distance between the rising edge of each pulse. In this way, the signal processing unit 154 gives an indication of the optical intensity of the radiation beam 170 after it traverses the sensing area. The larger the period of the square-wave pulse signal, the lower the optical intensity of the beam 170.

The beam generated by the radiation source 142 is coupled into the light conductor 42 at the tip portion 138. In one embodiment, the radiation source 142 generates a beam having a peak wavelength in the visible, infrared or near infrared region of the spectrum. More particularly, acceptable wavelengths can be 660 nm, 840 nm or between 910–940 nm. but these are given by way of example rather than by way of limitation. The beam travels through the light conductor 42 and is emitted from the other end of the light conductor 42 as a spatially nonuniform beam.

Referring once more to FIGS. 5, 7(a) and 7(b), the radiation beam emitted from the end of the light conductor may first be shaped by an aperture (not illustrated) in order to provide a beam having a more uniform spatial intensity. The radiation beam then enters the emitter lens body 392 through the upper cylindrical lens 410. The upper cylindrical lens 410 substantially collimates the beam in one dimension normal to its direction of travel. The beam continues to spread non-uniformly in other directions, and is then reflected 90 degrees by the prism 414. After being reflected by the prism 414, the beam continues to spread until it is refracted by aspherical lens 416. Aspherical lens 416 forms the beam into a substantially collimated, spatially uniform beam 170 that illuminates the sensing area, such as sensing area 404. In the preferred embodiment of the invention, the radiation, after passing through the sensing area where a portion of the beam may be temporarily blocked by one or more particles or seeds transiting the sensing area, is collected and focused by the spherical lens 420 of the receiver lens body 396 and is reflected 90 degrees by the prism 422. It then passes through the triangular-shaped vertical body portion 424 of the receiver lens. The light transmitting through the vertical body portion 424 enters a light concentrator 426 which concentrates the light into a narrow region so as to be directed into the core region of receiving optical fiber light conductor 44. The light then travels through the light conductor 44 until it reaches the radiation detector 148. Less advantageous alternatives (not illustrated) are to locate the radiation source adjacent the sensing area and to employ a large area detector adjacent the sensing area so as to receive the light directly from the sensing area, but these alternatives are not as immune to static discharge.

Figure 9:
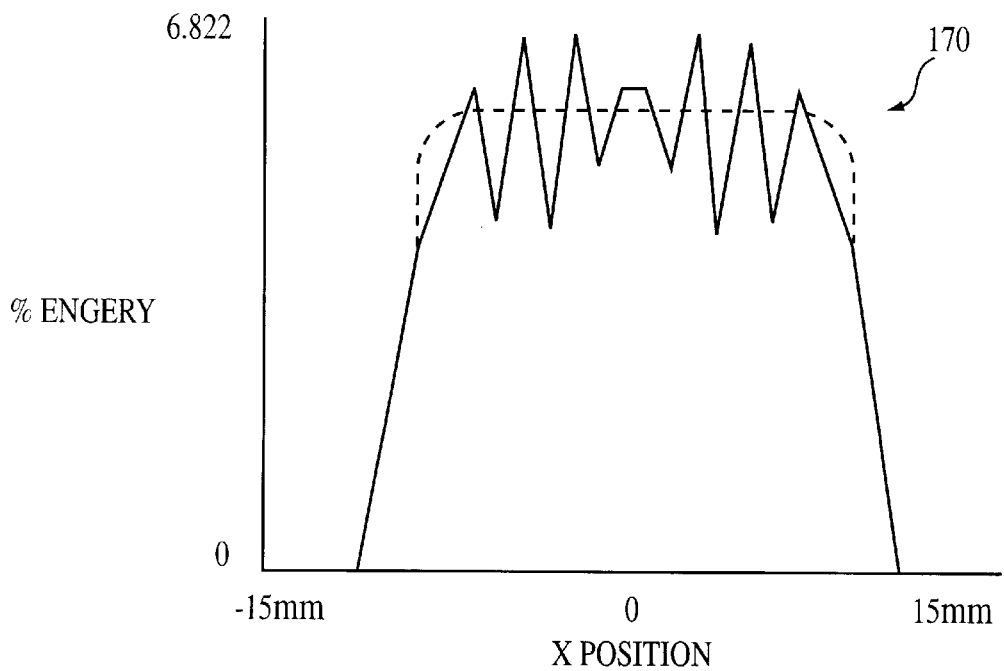
FIG. 9 shows an optical intensity graph of the optical beam at region in the seed sensing area of a seed tube.

FIG. 9 shows a graph of the energy distribution of the substantially collimated, spatially uniform beam 170. Position in the X direction is shown on the horizontal axis and percent of energy is shown on the vertical axis. The solid line of the graph of FIG. 9 results from a coarse distribution analysis using a relatively small number of discrete light rays in a light source model. In practice, the dashed line represents the real energy distribution across the X-direction, assuming that an infinite number of light rays is being emitted.

The radiation detector, such as detector 148, should preferably have a variable radiation intensity sensitivity that enables one to compensate for fluctuations in the nominal radiation intensity as defined by the intensity when no object is passing through the radiation beam 170 in the sensing area. The voltage/frequency converter 152 receives a voltage from the radiation detector that is representation of the light received from the photo diode array 150. The voltage/frequency converter 152 generates a square-wave pulse signal where the period of the square-wave is representative of the intensity of the radiation beam 170 at the photo diode array 150. The square-wave pulse signal is applied to the signal processing unit 154 as a square-wave input. The signal processing unit 154 measures the period of the square-wave pulse signal by measuring the distance between the rising edge of each pulse. In this way, the signal processing unit 154 gives an indication of the optical intensity of the radiation beam 170 after it traverses the sensing area. The lower the optical intensity detected, the larger is the period of the square-wave pulse signal.

A transmitting light conductor 42 and a receiving light conductor 44 are connected to the sensing module 40 for each sensing channel. As shown in FIG. 3, the transmitting light conductor 42 may comprise transmitting optical fibers 370 or 374 and the receiving light conductor 44 may comprise receiving optical fibers 372 or 376. In one embodiment, the light conductors 42 and 44 are each plastic, single cable, multi-mode optical fibers. Plastic optical fibers have been selected over glass optical fibers because of a number of advantages. These advantages include high flexibility, easy cutting and termination, and low cost. Single cable optical fibers have been selected over optical fiber bundles for reasons of simplicity and low cost. A typical optical fiber of the type described herein will include a core region, a cladding region surrounding the core region and an outer jacket material. The cladding region has a slightly lower index of refraction than the core region such that light rays that are emitted into the core region at or below a maximum angle will be substantially reflected at the core/cladding barrier so as to propagate down the fiber. In one specific embodiment, the plastic material of the core and cladding region is polymethylmethacrylate (PMMA) and the outer jacket material is a black polyethylene. Optical fibers of this type are available from AMP Incorporated, Harrisburg, Pa. as part nos. 501232-5 and 501336-1. However, as would be appreciated by one skilled in the art, different plastics could also be used for the optical fiber, or glass fibers could be used without departing from the scope of the invention.

An operator terminal 46 (FIG. 3) receives signals from the sensing module 40 over a cable 48. The operator terminal 46 includes a display screen 50 and a series of control switches 52. The operator terminal 46 offers a flexibility in the seed monitoring system 36 that can be tailored to accommodate a variety of different applications. Particularly, the display screen can be a custom liquid crystal display (LCD) and the switches can be hard-key switches for manual operator inputs. Also, the display screen can be a dot-matrix LCD and the switches 52 can be separated into hard-key switches and soft-key switches. Further, the switches 52 can be incorporated into a touch screen 50. Additionally, the operator terminal 46 can be a virtual terminal that is linked to a common data bus, such as CAN or SAE J1850B, where the virtual terminal gets its functional content and display content individually defined by external signal processing units, an example of which is sensing module 40. In this manner, the operator terminal 46 can be a terminal that is dedicated to only the data of the seed monitoring system 36, or can be a terminal accommodating various degrees of flexibility to be used with other types of implements towed by or mounted to the tractor 320, such as sprayers, balers and harvesters.

In the preferred embodiment, the sensing module 40 is mounted at a suitable location on the air seeder system 322 remotely from the sensors 360, 362. The operator terminal 46 is mounted at a suitable location on the tractor 320. A connector 54 is provided to disconnect the sensing module 40 from the operator terminal 46 when the air seeding system 322 is disconnected from the tractor 320. The cable 48 between the sensing module 40 and the operator terminal 46 can be an electrical cable or a fiber-optic cable. For those areas on the air seeding system 322 in which the light conductors 42 and 44 are exposed, and an optical cable connection is used between the sensing module 40 and the operator terminal 46, it may be desirable to run the optical fiber light conductors 42 and 44 and the cable 48 through appropriate conduit or selected reinforced cables. Such cables are available from PolyOptical Products, Inc., Irvine, Calif.

As will be discussed in detail below, the sensing module 40 generates an optical beam that is emitted down the light conductor 42 to traverse a seed tube. The optical beam is then collected, such as by receiver lens body 392, and returned to the sensing module 40 by the light conductor 44 where it is converted to a square-wave pulse signal indicative of the optical intensity of the beam within the seed tube. The particles or seeds 332 that are driven through the seed tubes by the fan 342 obscure a portion of an optical beam as it traverses a seed tube sensing area thereby causing transient reductions in the light detected at radiation detector 148. Signal processing algorithms associated with the sensing module 40 allow the seed monitoring system 36 to monitor and count particles, such as seeds of different shapes and sizes. Further, the seed monitoring system 36 can count several seeds or particles that pass simultaneously or partially simultaneously through the seed tubes. The electrical signals generated by the sensing module 40 are transmitted to the operator terminal 46 where they are displayed on the screen 50. Control switches 52 allow an operator to display various outputs generated by the sensing module 40 that give a physical representation of the quantity of seeds 332 being dispensed and the uniformity of the dispensing process in each of the seed tubes.

The signal output from the converter 152 of each channel is applied directly to a signal processing unit 154 of system 156 including a memory 158. A control line (for signal gain and sensitivity) from the converter 152 is applied to a multiplexer 160 that multiplexes all the control lines from all the different channels. An output from the multiplexer 160 is applied to the signal processing unit 154. A signal from the signal processing unit 154 is applied to the converter 152 so as to adjust the sensitivity of the detector 148 to allow for compensation for varying base line levels of radiation intensity. An output of the signal processing unit 154 is applied to a serial communication link 162 that is in connection with the operator terminal 46. The sensor channel 136, the system 156, the multiplexer 160 and the link 162 would be included as part of the sensing module 40 above.

Figure 10:
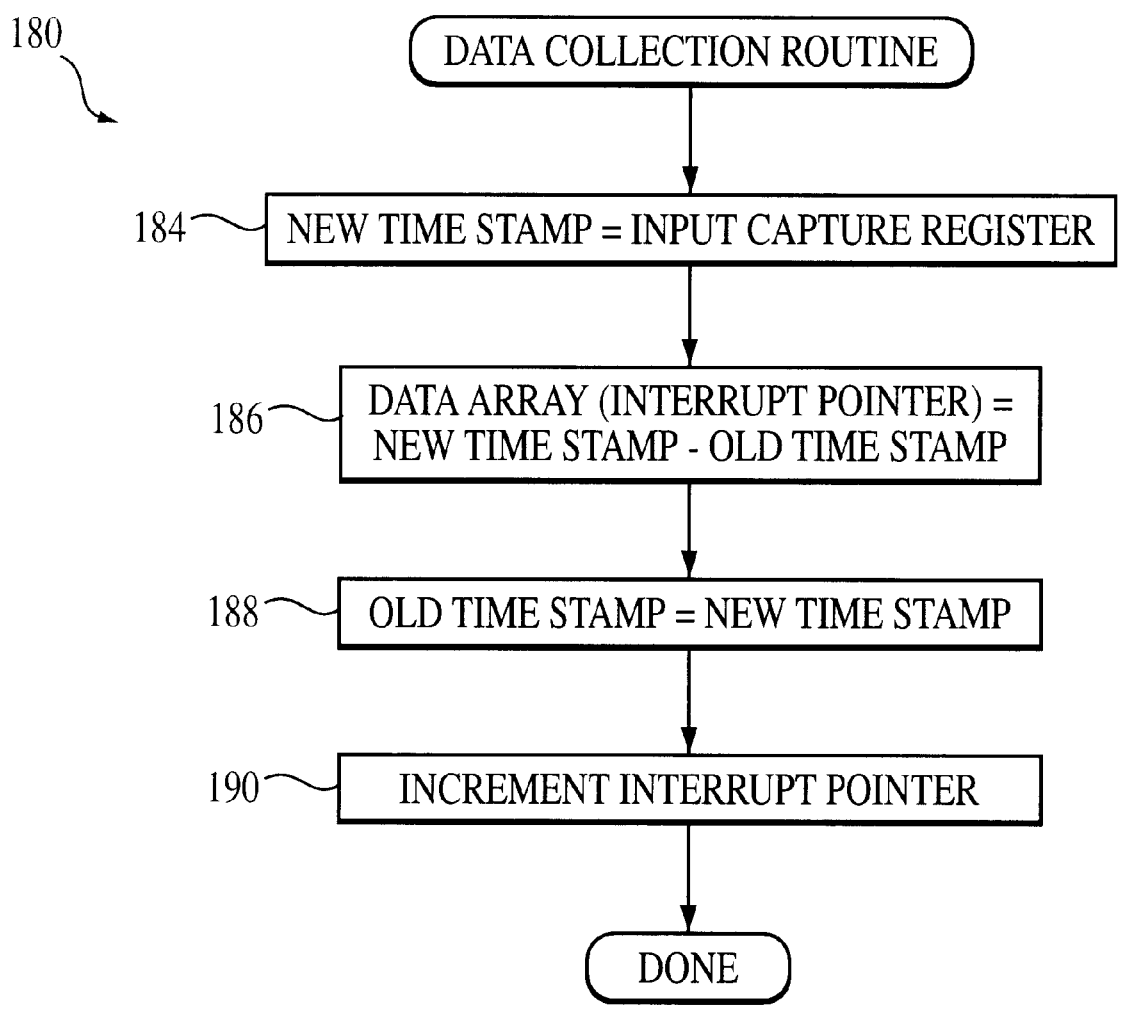
FIG. 10 is a flow chart diagram of a data collection routine of the seed monitor system according to the invention.
Figure 11A:
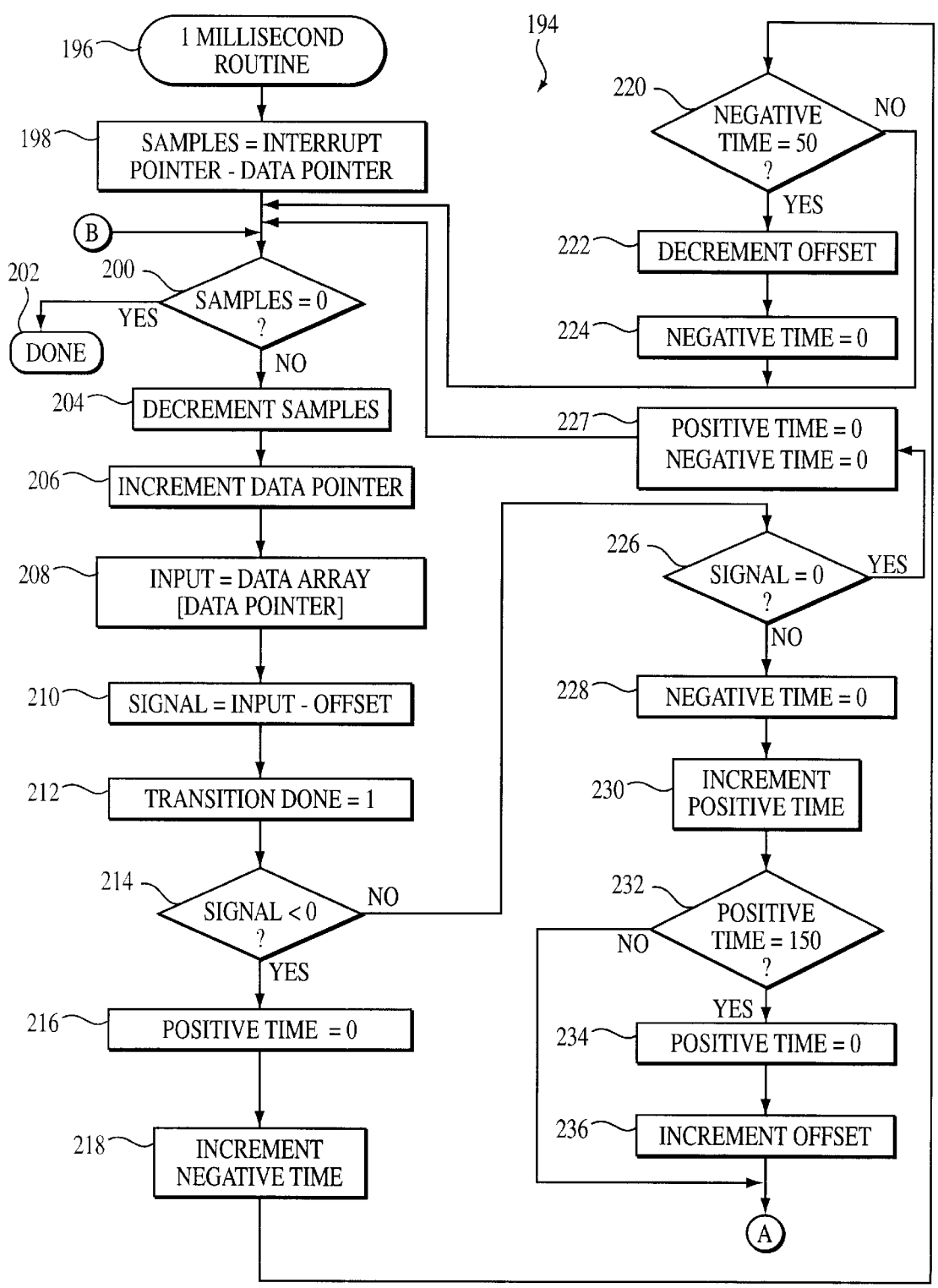
FIGS. 11(a) and 11(b) are flow chart diagrams of the signal processing unit software according to a first embodiment of the invention, showing the overall operation thereof.
Figure 11B:
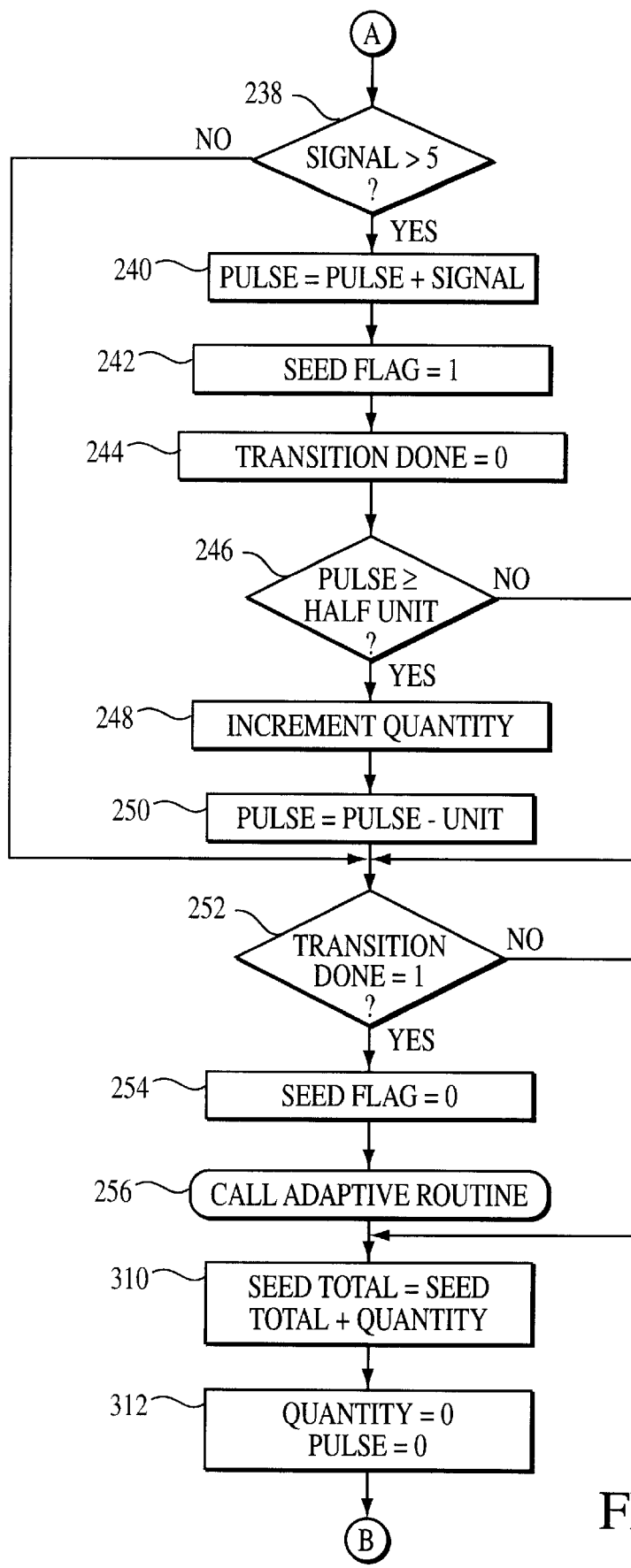
Figure 12A:
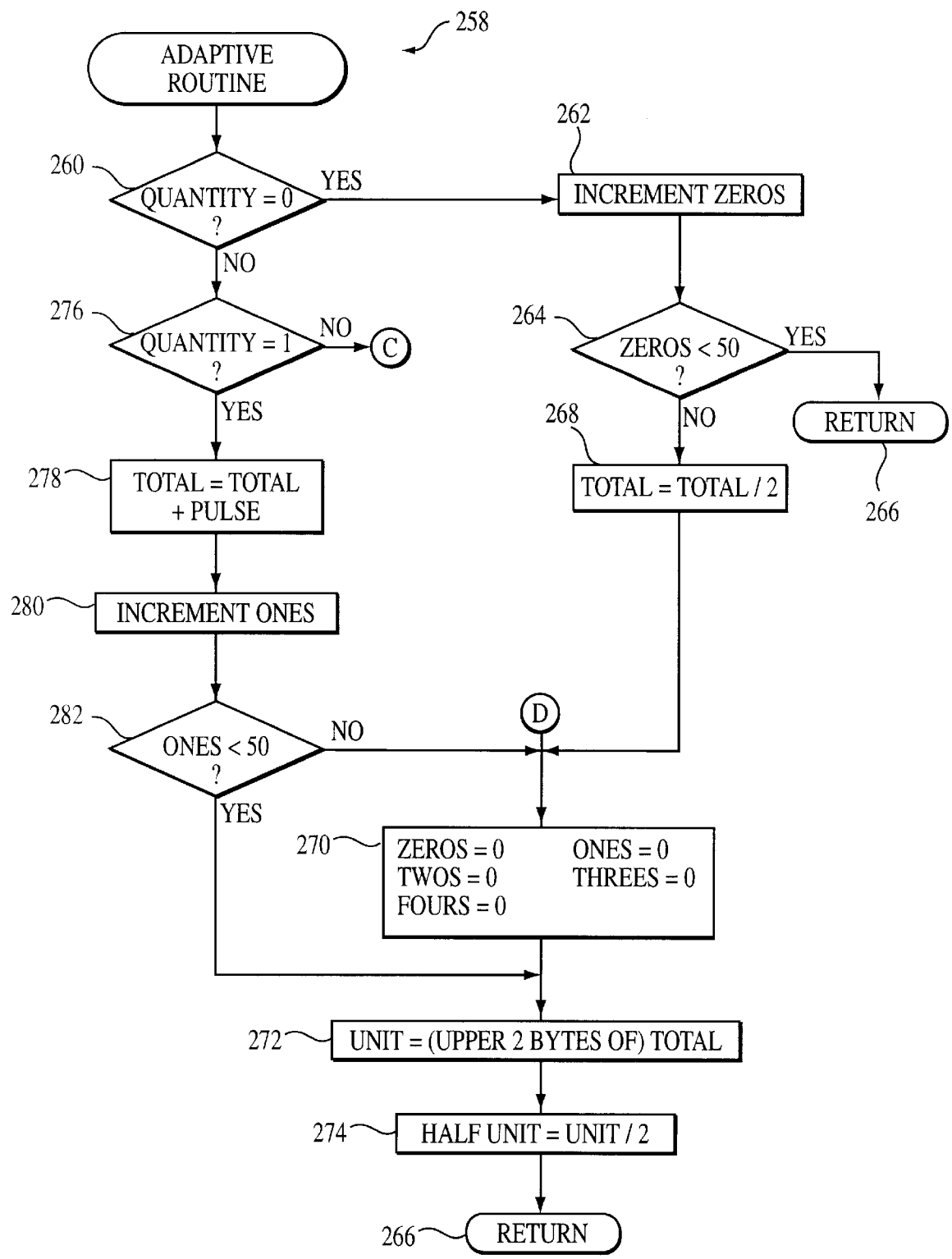
FIGS. 12(a) and 12(b) are flow chart diagrams of an adaptive routine called by the signal processing unit software of FIG. 11(b)
Figure 12B:
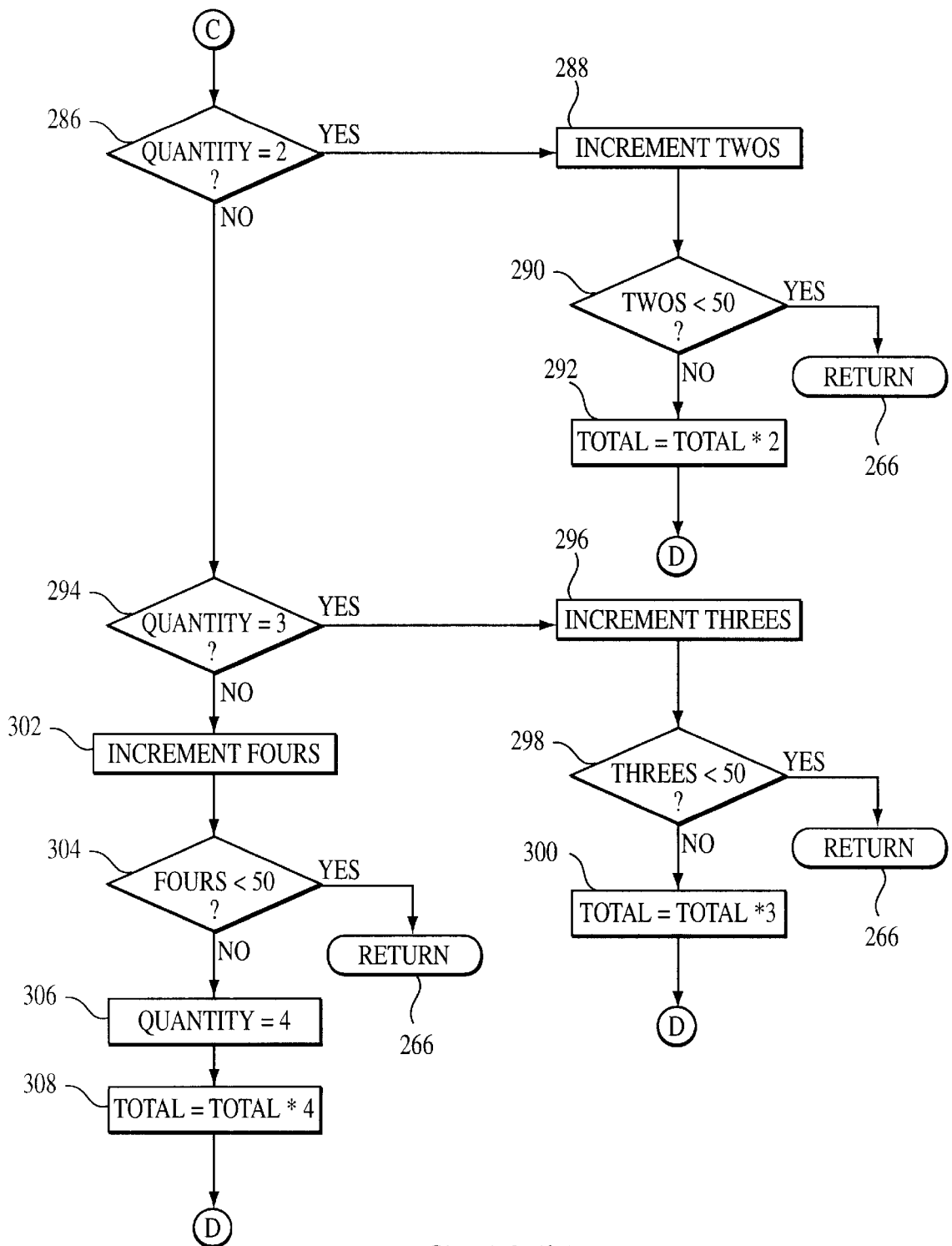

FIGS. 10–12(*b*) show functional block diagrams depicting the manner in which the signal processing unit 154 processes the information received from a detector, such as detector 148. The description below of this process describes one implementation of the system 36 to detect the presence or absence of particles within the seed tube. However, as will be appreciated by those skilled in the art, this process can be readily modified. For example, this process can be modified so that the frequency of, or the time between, subsequent particles passing the sensing area can be determined.

An overview of the process performed by the signal processing unit 154 for counting the seeds 322 as they pass through a sensing area will be given first. As mentioned above, the light energy of the radiation beam 170 from the sensing area is converted into a square-wave, pulse signal by the detector 148. The period of the pulse signal is inversely proportional to the light intensity. The period of the square-wave pulse signal is measured by an input capture peripheral within the signal processing unit 154. Data sampling is therefore done asynchronously, depending entirely on the frequency of the square-wave pulse signal. The signal processing unit 154 can control the sensitivity of the detector 148, and can appropriately scale the frequency of the square-wave pulse signal. For example, the sensitivity of the detector 148 can be increased such that sufficient information is gathered for each particle transition through the sensing area, and decreased so that the data samples are non-redundant. In one embodiment, the signal processing unit 154 adjusts the frequency of the pulse signal between 4 kHz and 20 kHz. However, the signal processing unit 154 can adjust the frequency of the pulse signal to different ranges depending on specific applications. Because the input capture peripheral is interrupt driven, i.e., asynchronous, data collection is separated from the signal evaluation. The signal processing is done synchronously, for example once per millisecond, to evaluate the data samples accumulated in that time frame.

The software within the signal processing unit 154 begins by establishing a base line period measurement. This base line period, referred to as an OFFSET variable, is the period of the square-wave pulse signal corresponding to no particles or seeds passing through the radiation beam 170 at the sensing area. Deviations from the OFFSET variable indicate obstructions in the sensing area that lower the light flux traversing the sensing area. As the detected light intensity is diminished by the particles or seeds traversing the sensing area, the deviation of the period measurements from the OFFSET variable is accumulated as a PULSE variable. The PULSE variable is then compared to a UNIT variable representing an average value associated with one particle or seed traversing the sensing area for a particular seed shape and size.

If the PULSE variable reaches half of the UNIT variable, the signal processing unit 154 counts a particle. The value of the UNIT variable is then subtracted from the PULSE variable, making the PULSE variable negative. If only one particle is traversing the radiation beam 170, accumulation of the deviations from the OFFSET variable will bring the PULSE variable back near zero. If multiple particles are passing through the radiation beam 170, the PULSE variable will continue to increase until another particle is counted and the UNIT variable will again be subtracted from the PULSE variable. This process continues until the value of a SIGNAL variable returns to the value of the OFFSET variable. The SAMPLES variable is a loop counter calculated once per time period as the difference between an interrupt pointer and a data pointer. The interrupt pointer is an index into a data array buffer that is advanced by each new data sample. The data array buffer is a circular buffer that contains the raw data period measurements. The data array is a circular buffer in that the address locations of data array wrap around such that, after the last register location is filled, the next register location to be filled is the first register location. The data array buffer can be included in the on-board random access memory of the signal processing unit 154. The data pointer is an index into the data array buffer that points to the sample being currently evaluated. Filtering is done on the OFFSET variable and the UNIT variable to adapt to different levels of light intensities and different particle sizes, respectively.

FIG. 10 shows a flow chart diagram 180 of a data collection routine setting out the process by which the system 156 fills the data array buffer with samples. The data collection routine is interrupt driven in that the time of each period of the square-wave pulse signal is recorded. In the step of box 184, a NEW TIME STAMP variable is defined as an input capture function. The length of the period is then determined by subtracting a previous TIME STAMP variable from the NEW TIME STAMP variable. The period is saved in the data array buffer at the step of box 186. The NEW TIME STAMP variable is then saved as an OLD TIME STAMP variable in the step of box 188. The interrupt pointer that establishes the address location where the next data sample is to be stored in the data array is incremented in the step of box 190. The periods of the square-wave pulse signal are continually stored in the data array in this manner. In one embodiment, the data array buffer includes 256 sample locations that store the last 256 consecutive periods of the pulse signal for data analysis.

FIGS. 11(*a*) and 11(*b*) illustrate a flow chart diagram 194 depicting a data analysis operation of the data stored in the data array buffer. In one embodiment, the data analysis sequence is performed in one millisecond as a one millisecond routine 196. Of course, other time intervals may be equally applicable for different applications. The process of the flow chart diagram 194 begins by initializing all the variables that are defined for the process. The number of samples stored in the data array buffer is determined by subtracting the data pointer from the interrupt pointer, and storing the result as the variable SAMPLES as depicted in the step of box 198. System 156 then begins a loop to evaluate the samples until no new data remain. The loop starts at the step of decision diamond 200 where system 156 determines if the SAMPLES variable equals zero. If the SAMPLES variable does equal zero, then the process is finished at the step of box 202.

If the SAMPLES variable does not equal zero, then system 156 decrements the SAMPLES variable at the step of box 204. The data pointer is incremented at the step of box 206. Then, system 156 defines an INPUT variable that receives the value in the data array buffer at the index location of the data pointer at the step of box 208. At the step of box 210, the SIGNAL variable is determined as the difference between the INPUT variable and the OFFSET variable. The OFFSET variable is the base line value of the data in the data array buffer, i.e., the period measurement when no seed is traversing the sensing area. Next, system 156 sets a TRANSITION DONE variable equal to one at the step of box 212. The TRANSITION DONE variable is a Boolean variable that is set at the start of the process for each sample, and is cleared if it is later learned that a particle is still transitioning the radiation beam 170.

The OFFSET variable is filtered by evaluating the SIGNAL variable by first determining if the SIGNAL variable is less than zero at the step of box 214. If the SIGNAL variable is less than zero, then the process defines a POSITIVE TIME variable as zero at the step of box 216. The POSITIVE TIME variable is the number of consecutive period measurements that are greater than the OFFSET variable. Next, a NEGATIVE TIME variable is incremented by one at the step of box 218. The process then determines if the NEGATIVE TIME variable is equal to fifty at the step of decision diamond 220. The NEGATIVE TIME variable is the number of consecutive period measurements that are less than the OFFSET variable. The value fifty is used in this specific embodiment as an example, and as such can be any appropriate value for other specific applications within the scope of the invention. If the NEGATIVE TIME variable does not equal fifty, then system 156 returns to the step of box 200 to determine if the SAMPLES variable equals zero. If, however, the NEGATIVE TIME variable does equal fifty, then system 156 decrements the OFFSET variable at the step of box 222, sets the NEGATIVE TIME variable to zero at the step of box 224, and then returns to the step of determining if the SAMPLES variable equals zero at the step of box 200.

If the SIGNAL variable is not less than zero at the step of decision diamond 214, then system 156 determines if the SIGNAL variable equals zero at the step of decision diamond 226. If the SIGNAL variable does not equal zero, then system 156 sets the NEGATIVE TIME variable to zero at the step of box 228, and increments the POSITIVE TIME variable at the step of box 230. System 156 then determines if the POSITIVE TIME variable is equal to one hundred fifty at the decision diamond 232. The value of one hundred fifty is used by way of a non-limiting example in that other values for the POSITIVE TIME variable can be equally applicable for different applications within the scope of the present invention. If the POSITIVE TIME variable does equal one hundred fifty, then system 156 sets the POSITIVE TIME variable equal to zero at the step of box 234, and increments the OFFSET variable at the step of box 236.

In this manner, if the NEGATIVE TIME variable reaches fifty, then the OFFSET variable is decremented, and if the POSITIVE TIME variable reaches one hundred fifty, then the OFFSET variable is incremented. If the SIGNAL variable is zero at the step of decision diamond 226, then the POSITIVE TIME variable and NEGATIVE TIME variable are both reset to zero and the process returns to the step of decision diamond 200.

If the POSITIVE TIME variable does not equal one hundred and fifty at the step of decision diamond 232, or the system 156 increments the OFFSET variable at the step of box 236, the system 156 then determines if the SIGNAL variable is greater than a threshold value at the step of decision diamond 238. In this example, the threshold value is set to be five; however, this threshold value is used as a non-limiting example in that other threshold values for different applications would be equally applicable without departing from the scope of the invention. If the SIGNAL variable is greater than the threshold value, then system 156 adds the SIGNAL variable to an integration variable PULSE at the step of box 240. The integration variable PULSE is the accumulation of all of the SIGNAL variables that are greater than the threshold value. System 156 then sets a SEED flag to one and the TRANSITION DONE flag to zero at the steps of boxes 242 and 244, respectively. The SEED flag is a Boolean variable that is set each time a signal is found to be greater than five (the value of five being used by way of a non-limiting example), and is cleared when it is later found that the seed transition through the radiation beam 170 is finished.

The PULSE signal is then evaluated to count the number of particles traversing the sensing area. Each time the PULSE variable exceeds half of the UNIT variable at the step of decision diamond 246, another particle is detected and a QUANTITY variable is incremented at the step of box 248. The UNIT variable is then subtracted from the PULSE variable at the step of box 250. The UNIT variable is a value representing the average size of a pulse created by a particle passing through the sensing area. Next, system 156 determines if the TRANSITION DONE variable is equal to one at the decision diamond 252. If the TRANSITION DONE variable is equal to one, then system 156 sets the SEED flag to zero at the step of 254. The UNIT variable is then filtered by the adaptive routine called at box 256.

FIGS. 12(*a*) and 12(*b*) illustrate a flow chart diagram 258 of the adaptive routine called by box 256. The filtering process first determines if a QUANTITY variable is equal to zero at the step of decision diamond 260. The QUANTITY variable is the number of particles or seeds counted in the current PULSE variable.

If the QUANTITY variable is equal to zero, then system 156 will increment a zeros register at the step of box 262. The zeros register stores the number of particles which passed through the radiation beam 170 but did not accumulate a large enough value in the PULSE variable to be considered a whole particle to be counted. Likewise, a ones register stores the number of particles counted as one discrete particle, a twos register stores the number of particle clusters passing through the radiation beam 170 that are counted as two particles, a threes register stores the number of particle clusters that pass through the radiation beam that are counted as three particles, and a fours register stores the number of particle clusters passing through the radiation beam 170 that are counted as four or more particles. Of course, system 156 can be tailored to include other registers that store the number of particles passing through the radiation beam as more than four particles, or can be tailored to reduce the number of registers to one, two or three. System 156 will then determine if the zeros register is less than fifty. If the zeros register is less than fifty, then system 156 returns to the main routine at the step of box 266. If, however, the zeros register is not less than fifty, then a TOTAL variable is set to the previous TOTAL variable divided by two at the step of box 268. The TOTAL variable is a filter variable that includes the UNIT variable and a fractional value. System 156 will then set all of the zeros through fours registers to zero at the step of box 270.

If the QUANTITY variable does not equal zero at the decision diamond 260, then system 156 determines if the QUANTITY variable equals one at decision diamond 276. If the QUANTITY variable does equal one, then system 156 sets a new TOTAL variable equal to the past TOTAL variable plus the PULSE variable at box 278. The system then increments the ones register at the step of box 280. System 156 then determines if the ones register is less than fifty at decision diamond 282. If the ones register is not less than fifty, then system 156 sets the zeros register, the ones register, the twos register, the threes register, and the fours register to zero at the step of box 270.

After these registers are set to zero, or if the ones register is less than fifty, the process sets the UNIT variable equal to the TOTAL variable at the step of box 272. The process will then set the HALF UNIT variable equal to the UNIT variable divided by two at the step of box 274, and will then return to the main process at the step of box 266. If the QUANTITY variable does not equal one at the step of decision diamond 276, then system 156 determines if the QUANTITY variable is equal to two at decision diamond 286. If the QUANTITY variable is equal to two, then system 156 increments the twos register at the step of box 288. System 156 then determines if the twos register is less than fifty at the decision diamond 290. If the twos register is less than fifty, then system 156 returns to the step of box 266. If, however, the twos register is not less than fifty, then system 156 sets the TOTAL variable equal to the previous TOTAL variable times two at the step of box 292. System 156 then returns to the box of setting the zeros through fours registers equal to zero at the step of box 270.

If system 156 determines that the QUANTITY variable does not equal two at the step of decision diamond 286, system 156 will determine if the QUANTITY variable equals three at the step of decision diamond 294. If the QUANTITY variable does equal three at the decision diamond 294, then the system 156 will increment the threes register at the step of box 296. The system 156 will determine if the threes register is less than fifty at the decision diamond 298. If the threes register is less than fifty, then the system 156 returns to the process of the main algorithm at the step of box 266. If, however, the threes register is not less than fifty, then the system 156 multiplies the current TOTAL variable by three to get a new TOTAL variable at the step of box 300. The system 156 then returns to the step of setting the zeros through fours registers to zero at the step of box 270.

If the system 156 determines that the QUANTITY variable does not equal three at the decision diamond 294, the system 156 increments the fours register at the step of box 302. The system 156 then determines if the fours register is less than fifty at the decision diamond 304. If the fours register is less than fifty, then the system 156 returns to the main process at box 266. If, however, the fours register is not less than fifty, the system 156 will set the QUANTITY variable equal to four and determine a new TOTAL variable as the previous TOTAL variable times four at the step of box 308. The system 156 will then return to the step of setting the zeros through fours registers to zero at the step of box 270.

Referring again to FIG. 11(*b*), upon completion of the routine called at box 256 or if the TRANSITION DONE flag does not equal one at the decision diamond 252, the system 156 will set a new SEED TOTAL variable as the previous SEED TOTAL variable plus the QUANTITY variable at the step of box 310. The system 156 will then set the QUANTITY variable and the PULSE variable equal to zero at the step of box 312. The system 156 will then return to the loop to determine if the SAMPLES variable is equal to zero at the decision diamond 200.

Figure 13:
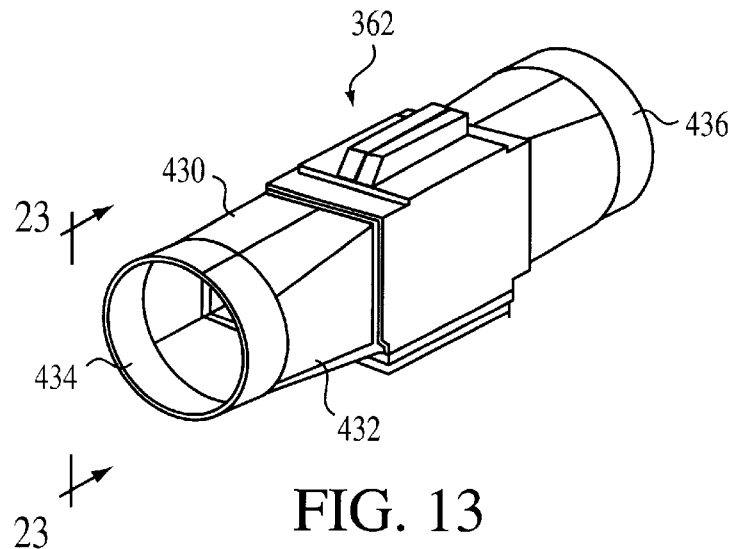
FIG. 13 is a perspective view of a secondary sensor of the invention.

FIG. 13 shows a perspective view of the secondary sensor 362, according to one embodiment of the present invention. The secondary sensor 362 is also a plastic body formed of a first housing half 430 and a second housing half 432 that have been injection-molded and attached together by ultrasonic welding, adhesive or the like. The secondary sensor 362 includes openings 434 and 436 at each end in order to accept the secondary seed tube 348. The secondary seed tube 348 is attached to the secondary seed sensor 362 by any suitable mechanism, such as hose clamps, glue, etc. The secondary sensor has the shape as shown to conform to the secondary seed tubes 348. However, as will be appreciated by those skilled in the art, other suitable shapes can be used within the scope of the invention.

Figure 14:
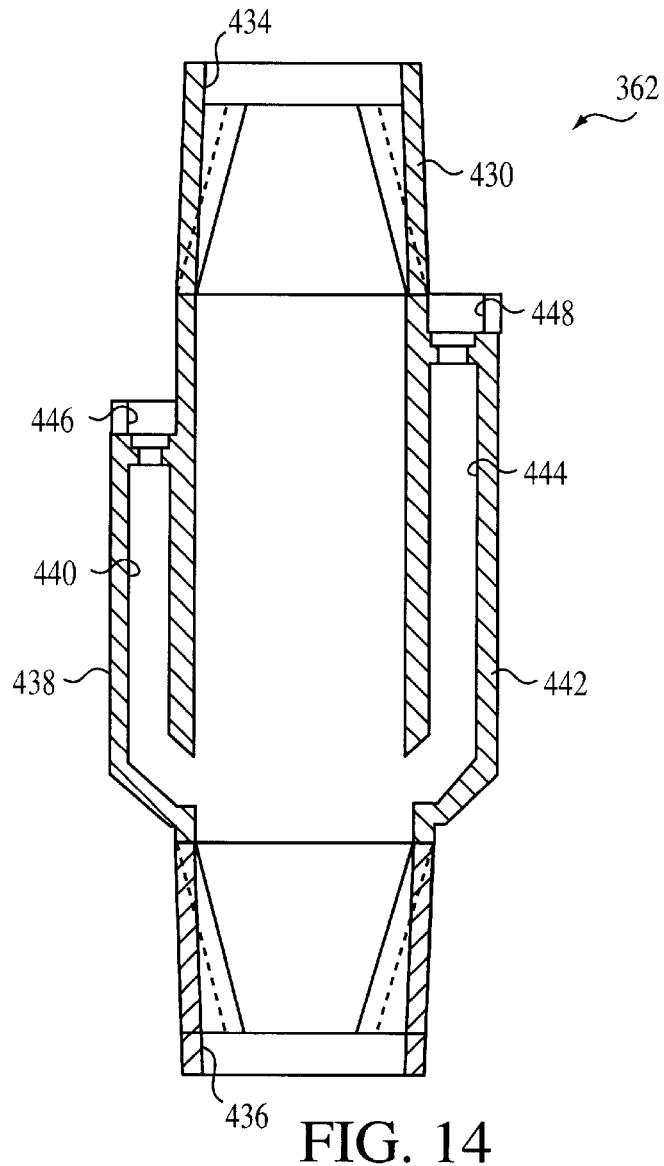
FIG. 14 is a cut-away, side view of the secondary sensor of FIG. 13.

FIG. 14 shows a cross-sectional side view of the first half 430 of the secondary sensor 362. In this view, the emitter lens body and the receiver lens body have been removed, but it will be appreciated by those skilled in the art that the emitter lens is body 392 and the receiver lens body 396 discussed above are applicable for the secondary sensor 362. The secondary sensor 362 includes an emitter housing 438 including an emitter lens cavity 440 that accepts the emitter lens body. Likewise, the secondary sensor 362 includes a receiver lens housing 442 that includes a receiver lens cavity 444 for receiving the receiver lens body. Also, the emitter lens housing 438 includes an opening 446 for positioning a transmitting fiber-optic cable, and the receiver lens housing 442 includes an opening 448 for positioning a detecting fiber-optic cable. The operation of the secondary sensor 362 is the same as above; however, only a single emitter lens body and receiver lens body is necessary because of the smaller diameter of the secondary seed tube 348.

Figure 15:
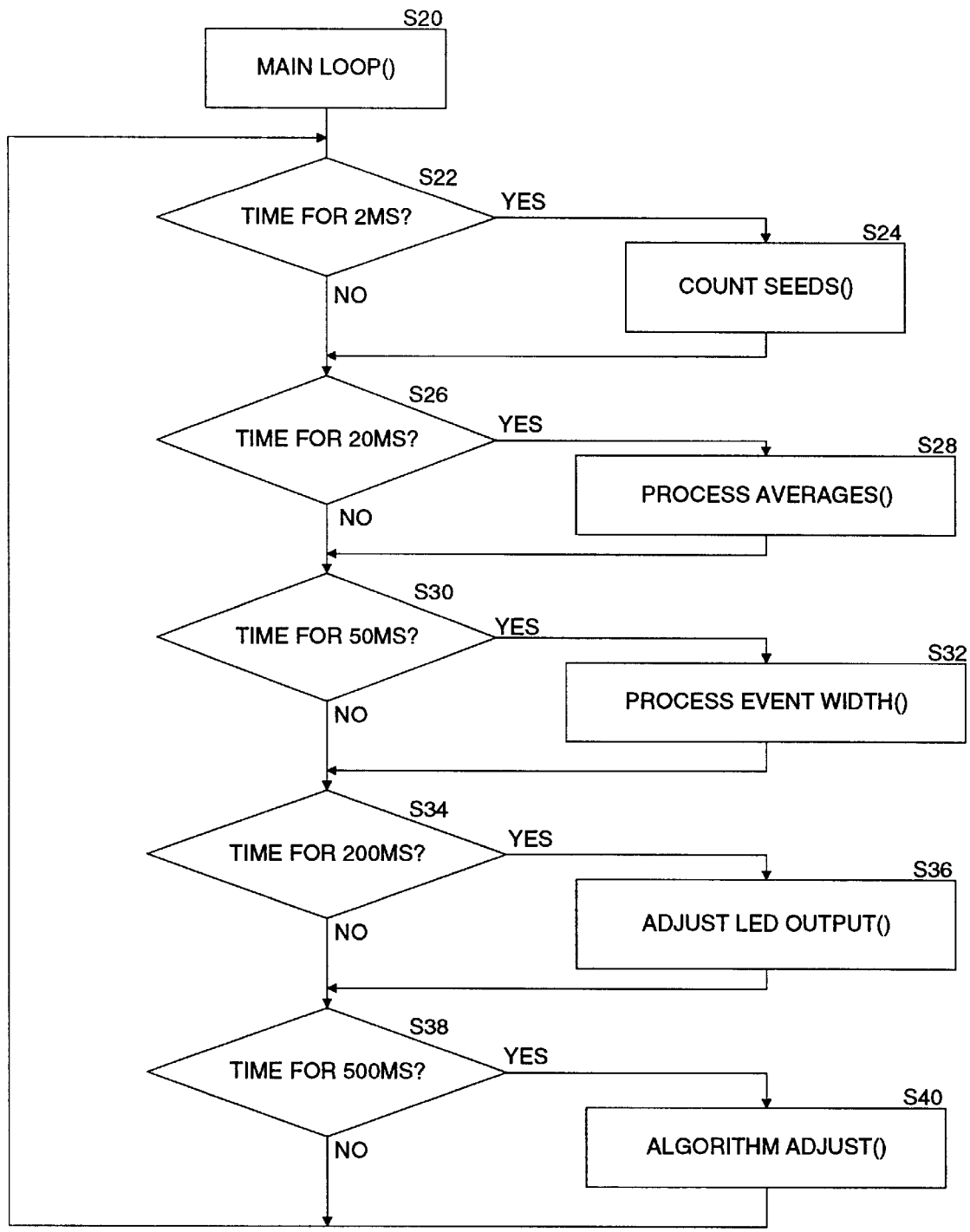
FIGS. 15–22 illustrate a second embodiment of the software of the invention, which is an alternative to the software illustrated in FIGS. 11(a), 11(b), 12(a) and 12(b)

FIG. 15 is a flowchart diagram of a Main Loop routine for a second embodiment of the signal processing unit software. This diagram indicates the time intervals that each of five subroutines are called in the preferred embodiment of the invention.

In FIG. 15, Step 20 signals the beginning of the Main Loop routine, Control will proceed to Step 22. Step 22 is a decision diamond which will be called periodically. If a counter reaches a value equivalent to multiples of 2 ms, control proceeds to Step 24, the Count Seeds subroutine (which will be further illustrated in FIG. 16). All paths then proceed to Step 26. Step 26 is a decision diamond which will be called periodically. If the counter reaches a value equivalent to multiples of 20 ms, control proceeds to Step 28. In Step 28, the Process Averages subroutine will be called (which will be further illustrated in FIG. 18). All paths then proceed to Step 30.

Step 30 is a decision diamond which will be called periodically. If the counter reaches a value equivalent to multiples of 50 ms, control proceeds to Step 32. In Step 32, the Process Event Width subroutine will be called (which will be further illustrated in FIG. 19). All paths then proceed to Step 34.

Step 34 is a decision diamond which will be called periodically. If the counter reaches a value equivalent to multiples of 200 ms, control proceeds to Step 36. In Step 36, the Adjust LED (Light Emitting Diode) Output subroutine will be called (which will be further illustrated in FIG. 21). All paths then proceed to Step 38.

Step 38 is a decision diamond which will be called periodically. If the counter reaches a value equivalent to multiples of 500 ms, control proceeds to Step 40. In Step 40, the Algorithm Adjust subroutine will be called (which will be further illustrated in FIG. 22). All paths will then return to Step 22, where the Main Loop routine will be repeated.

Figure 16:
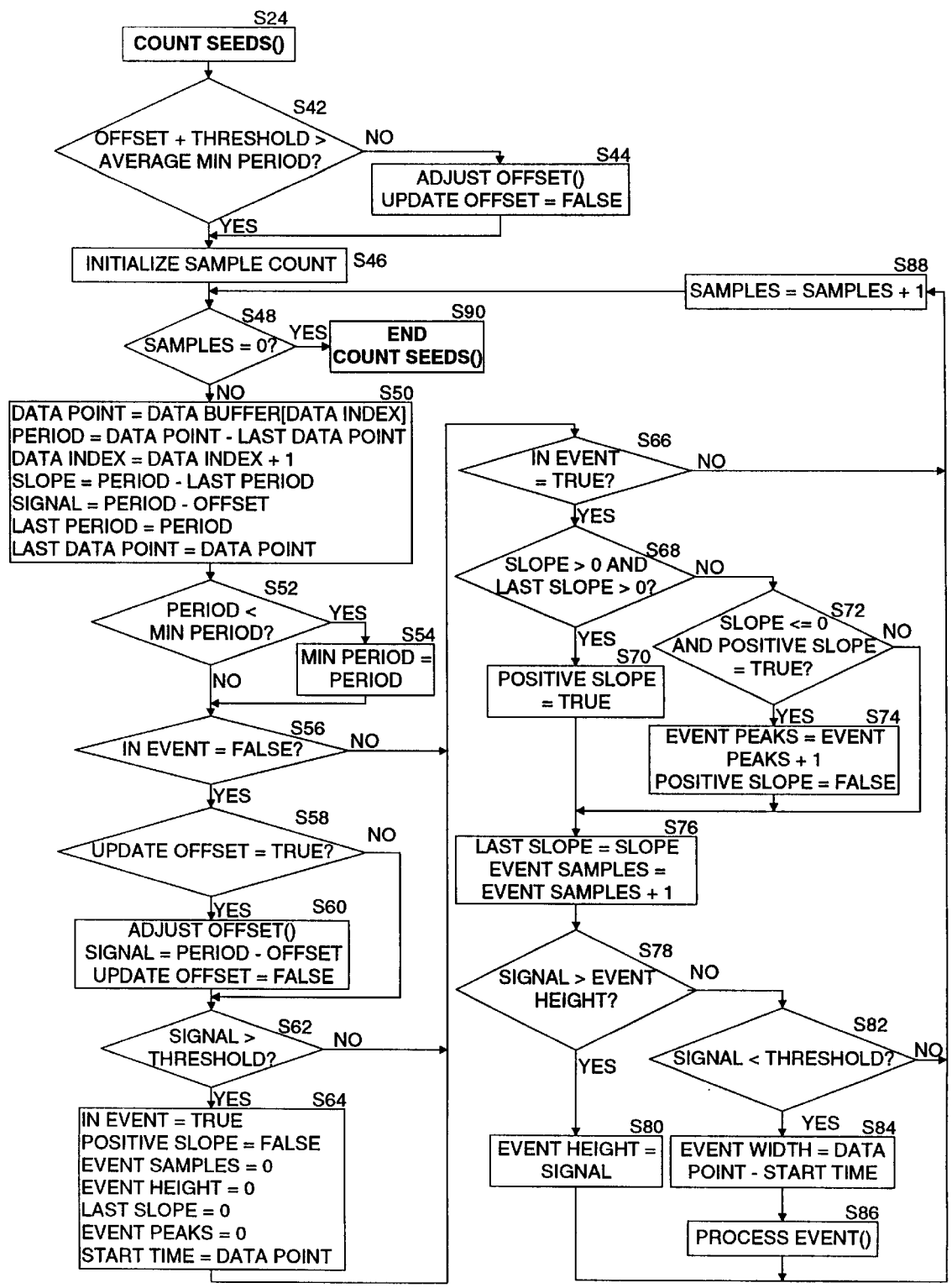

FIG. 16 is a flowchart diagram of the Count Seeds subroutine (Step 24, FIG. 15). This subroutine examines all the collected data and determines the beginning and ending of a seed event. Step 24 signals the beginning of the Count Seeds subroutine. Control will proceed to Step 42. Step 42 is a decision diamond which will compare the sum of the offset value and the threshold value against the average minimum period. If this sum is greater than the average minimum period, then control will proceed to Step 46. If, in Step 42, this sum is not greater than the average minimum period, then control will proceed to Step 44. In Step 44, the Adjust Offset subroutine (illustrated in FIG. 20) will be called to reinitialize the OFFSET variable. This is to ensure that there has been no change in the average minimum data level and to ensure that proper operating conditions are regained. After Step 44, control will proceed to Step 46. In Step 46, the sample count will be initialized. Control will then proceed to Step 48.

Step 48 begins a loop which will continue as long as there are data samples to be processed. Step 48 is a decision diamond which checks if NUMBER OF SAMPLES is equal to zero. If NUMBER OF SAMPLES is not equal to zero, then control will proceed to Step 50. In Step 50, various intermediate values will be accumulated. A data point will be taken from the buffer of collected data. A PERIOD variable, which equals the current data point minus the last data point, will be calculated. A DATA INDEX, which is the index into the data buffer, will be incremented by one. A SLOPE VALUE will be calculated, which is equal to the PERIOD variable minus the previous PERIOD variable (i.e., LAST PERIOD). The SIGNAL variable will be calculated, which is equal to the PERIOD variable minus the OFFSET variable. The LAST PERIOD variable will be updated to be equal to the current PERIOD variable. The last DATA POINT variable will be set equal to the current DATA POINT variable. Control will then proceed to Step 52.

Step 52 is a decision diamond which checks if the PERIOD variable is less than the MINIMUM PERIOD variable. If the PERIOD variable is not less than the MINIMUM PERIOD variable, then control will proceed to Step 56. If the PERIOD variable is less than the MINIMUM PERIOD variable, then control will proceed to Step 54. In Step 54, the MINIMUM PERIOD variable will be set equal to the PERIOD variable. Control will then proceed to Step 56.

Step 56 is a decision diamond which checks the In Event Boolean. If the In Event Boolean is TRUE, it indicates that a seed event is occurring. If the In Event Boolean is FALSE, then control will proceed to Step 58. Step 58 is a decision diamond which checks the Update Offset Boolean. If the Update Offset Boolean is FALSE, then control will proceed to Step 62.

If, in Step 58, the Update Offset Boolean is TRUE, then control will proceed to Step 60. In Step 60, the Adjust Offset subroutine will be called (which will be further illustrated in FIG. 20). The SIGNAL value will be recalculated by making it equal the PERIOD variable minus the OFFSET variable. Then, the Update Offset Boolean will be set to FALSE. Control will then proceed to Step 62.

Step 62 is a decision diamond which checks if the SIGNAL variable is greater than the THRESHOLD variable. If the SIGNAL variable is greater than the THRESHOLD variable, then control will proceed to Step 64. In Step 64, all parameters which are used to accumulate event data from following samples will be reset to initial values. The In Event Boolean will be set to TRUE. The Positive Slope Boolean will be set to FALSE. The EVENT SAMPLES, EVENT HEIGHT, LAST SLOPE, and EVENT PEAKS variables will all be set equal to zero. The START TIME variable will be set equal to the DATA POINT variable. At this point, all paths proceed to Step 66.

Step 66 is a decision diamond which checks the In Event Boolean. If the In Event Boolean is set to TRUE, then control will proceed to Step 68. This is the path which will be taken when a seed event is occurring. Step 68 is a decision diamond which checks if the SLOPE variable is greater than zero and if the previous value of SLOPE (i.e., LAST SLOPE) was greater than zero, indicating two successively larger data points. If both these conditions are true, then control will proceed to Step 70. In Step 70, the Positive Slope Boolean will be set to TRUE. Control will then proceed to Step 76.

Returning to Step 68, if the SLOPE variable is not greater than zero or the LAST SLOPE variable is not greater than zero, then control will proceed to Step 72. Step 72 is a decision diamond which checks if the SLOPE variable is less than or equal to zero and the Positive Slope Boolean is set to TRUE. If both these conditions are true, indicating that there has been an event peak, control will proceed to Step 74. In Step 74, the event peak counter will be incremented by one, and the Positive Slope Boolean will be set to FALSE. All paths will then proceed to Step 76. In Step 76, the LAST SLOPE variable will be set equal to the SLOPE variable and the event samples count will be incremented by one. Control will proceed to Step 78.

Step 78 is a decision diamond which checks if the signal is greater than the event height. If the signal is greater than EVENT HEIGHT, then control will proceed to Step 80. In Step 80, EVENT HEIGHT will be set equal to SIGNAL. Returning to Step 78, if the signal is less than or equal to EVENT HEIGHT, then control will proceed to Step 82.

Step 82 is a decision diamond which checks if the signal is less than the THRESHOLD variable. If the signal is less than the THRESHOLD variable, indicating that the seed event has ended, then control will proceed to Step 84. In Step 84, the EVENT WIDTH will be calculated, which is equal to the current time (i.e., the time of Yes from step 82) minus START TIME. The event width is a measure of the length of time the seed event occurred. After Step 84, control will proceed to Step 86. In Step 86, the Process Event subroutine will be called (which will be further illustrated in FIG. 17). At this point, all paths will proceed to Step 88. In Step 88, the SAMPLES variable will be decremented (e.g., SAMPLES equal SAMPLES minus 1). Control will then return to Step 48. If, in Step 48, the SAMPLES variable is equal to zero, then control will proceed to Step 90, which signals the end of the Count Seeds subroutine and control will return to the Main Loop routine (FIG. 15).

Figure 17:
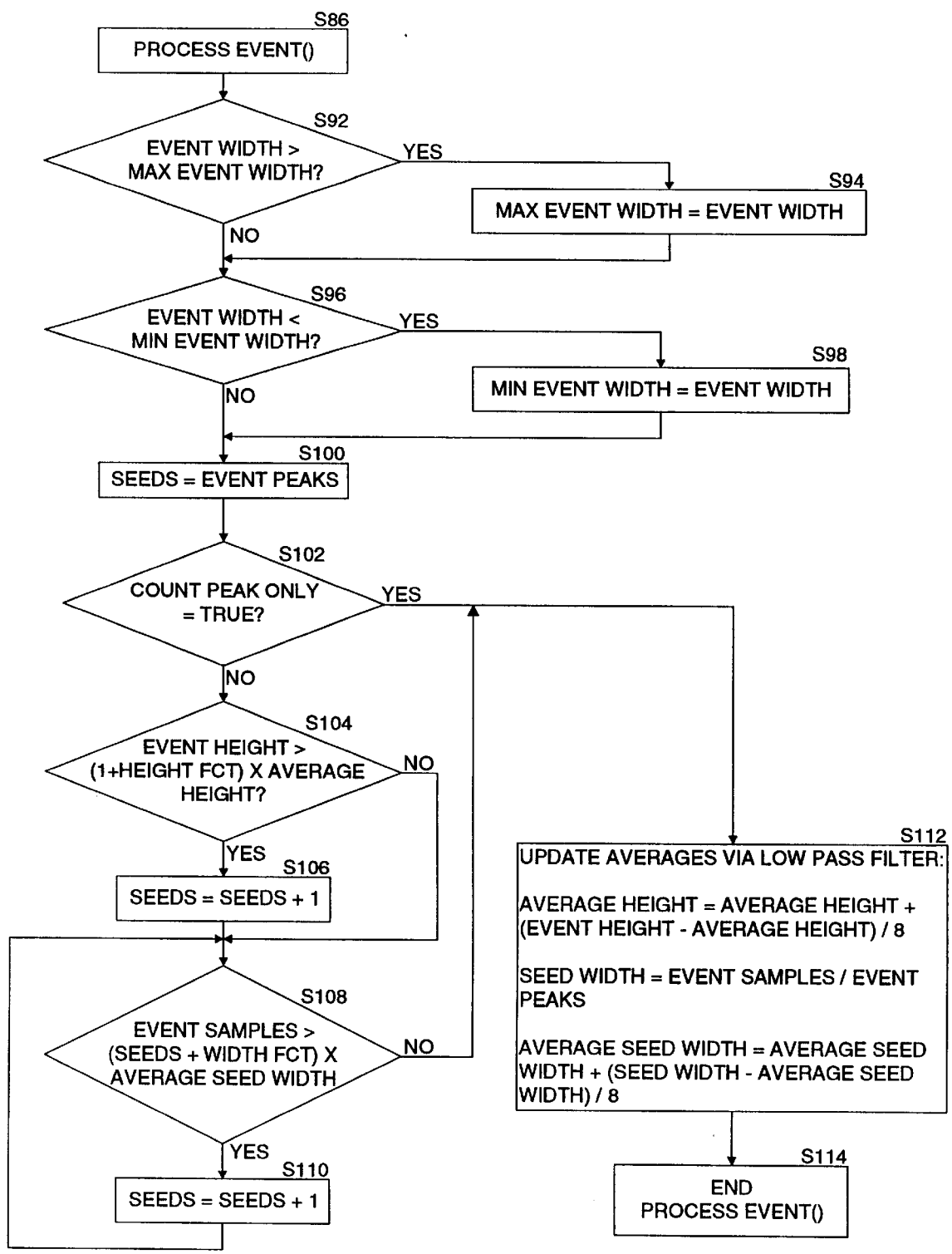

FIG. 17 is a flowchart diagram of the Process Event subroutine (Step 86, FIG. 16). Process Event is the subroutine that determines the number of seeds that occurred in the last seed event. Step 86 signals the beginning of the Process Event subroutine. Control will then proceed to Step 92.

Step 92 is a decision diamond which checks if the EVENT WIDTH variable is greater than the MAXIMUM EVENT WIDTH variable. If this is true, then control will proceed to Step 94. In Step 94, the MAXIMUM EVENT WIDTH variable will be updated to equal the EVENT WIDTH variable. Control will proceed to Step 96. Returning to Step 92, if the EVENT WIDTH variable is less than or equal to the MAXIMUM EVENT WIDTH variable, then control will proceed to Step 96.

Step 96 is a decision diamond which checks if the EVENT WIDTH variable is less than the MINIMUM EVENT WIDTH variable. If this is true, control will proceed to Step 98. In Step 98, the MINIMUM EVENT WIDTH variable is updated to equal the EVENT WIDTH variable. Control will then proceed to Step 100. Returning to Step 96, if the EVENT WIDTH variable is not less than the MINIMUM EVENT WIDTH variable, then control will proceed to Step 100.

In Step 100, the SEEDS variable will be set equal to the EVENT PEAKS variable. Control will then proceed to Step 102. Step 102 is a decision diamond which checks the Count Peak Only Boolean. If the Count Peak Only Boolean is FALSE, then control will proceed to Step 104. Step 104 is a decision diamond based on the event height. Interpreting the variable "heightFct" as a percent, if the event height is "heightFct" percent larger than the average event height, then control will proceed to Step 106. In step 106, the SEEDS variable will be incremented by one. Control will then proceed to Step 108. Returning to Step 104, if the event height is not "heightFct" percent larger than the average event height, then control will proceed to Step 108.

Step 108 is a decision diamond which checks the number of samples to see if there are sufficient samples to indicate additional seeds in the event. Interpreting the WidthFct as a percent and considering an expected event width equaling the average event width multiplied by the number of seeds in the event, if the event samples is "WidthFct" percent greater than the expected width, then control will proceed to Step 110. In Step 110, the seed counter will be incremented by one. Control then returns to Step 108. This loop will continue until the SEEDS variable has been incremented sufficiently such that, in Step 108, the EVENT SAMPLES variable comparison fails. At this point all paths will proceed to Step 112.

In Step 112, the event averages will be updated using a digital low-pass filter. The event height filter will be updated and the seed width will be scaled. The SEED WIDTH variable is defined as a calculation of the event samples, which indicates the width of the seed event, divided by the number of peaks in the seed event. This provides an average width for each seed in the seed event. The average seed width will then be updated with a digital low-pass filter. Control will then proceed to Step 114, which signals the end of the Process Event subroutine.

Figure 18:
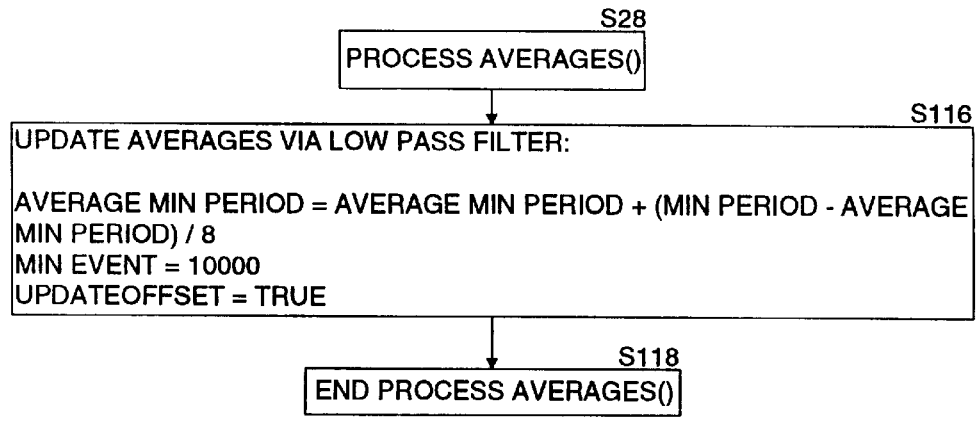

FIG. 18 is a flowchart diagram of the Process Averages subroutine (Step 28, FIG. 15). Step 28 signals the beginning of the Process Averages subroutine. Control will proceed to Step 116, which will update the AVERAGE MINIMUM PERIOD variable using a digital low-pass filter. The AVERAGE MINIMUM PERIOD variable is a measure of the detected light beam with no particles present in the sensing area. The equation for the AVERAGE MINIMUM PERIOD is an implementation of a low-pass filter using the MINIMUM PERIOD as new data to calculate AVERAGE MINIMUM PERIOD. The minimum period will be set equal to 10,000. The Update Offset Boolean will be set to TRUE. Control will then proceed to Step 118, which signals the end of the Process Averages subroutine and returns control to the Main Loop routine (FIG. 15).

Figure 19:
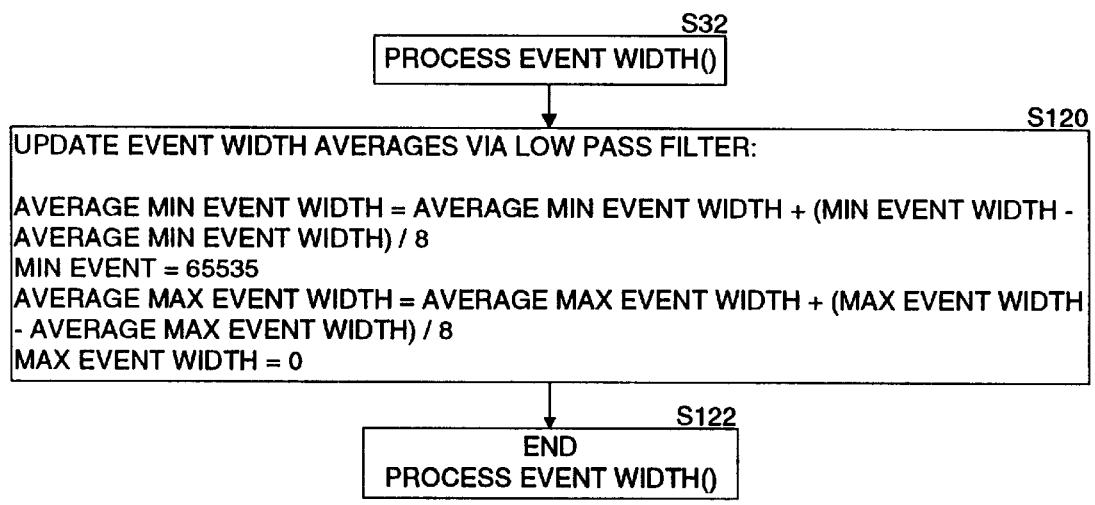

FIG. 19 is a flowchart diagram of the Process Event Width subroutine (Step 32, FIG. 15). Step 32 signals the beginning of the Process Event Width subroutine. Control will then proceed to Step 120. In Step 120, the event width averages will be updated using a digital low-pass filter. The equation for the AVERAGE MINIMUM EVENT WIDTH variable is an implementation of a low-pass filter using the MINIMUM EVENT WIDTH as new data to calculate the AVERAGE MINIMUM EVENT WIDTH. The MINIMUM EVENT variable will then be set equal to 65,535. The AVERAGE MAXIMUM EVENT WIDTH variable will be updated using a digital low-pass filter. The equation for the AVERAGE MAXIMUM EVENT WIDTH is an implementation of a low-pass filter using the MAXIMUM EVENT WIDTH as new data to calculate AVERAGE MAXIMUM EVENT WIDTH. The MAXIMUM EVENT WIDTH variable will then be set equal to zero. Control will proceed to Step 122, which signals the end of the Process Event Width subroutine and control returns to the Main Loop routine (FIG. 15).

Figure 20:
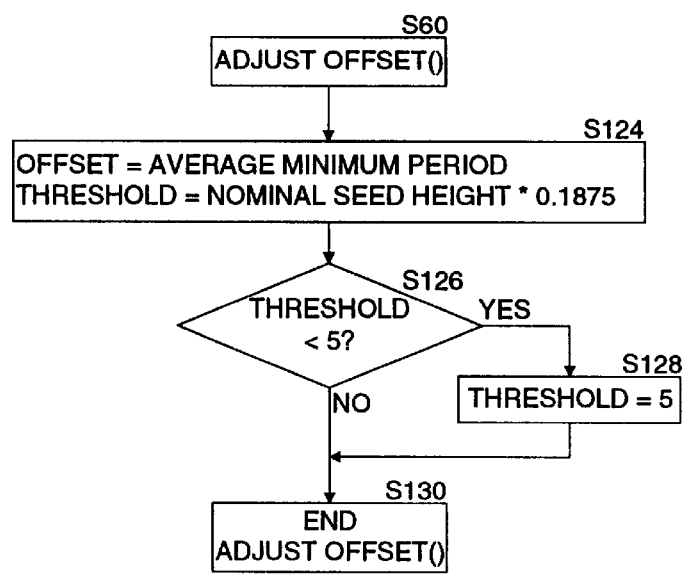

FIG. 20 is a flowchart diagram of the Adjust Offset subroutine (Step 44, FIG. 16). Offset is an indication of the ambient light level. Step 44 signals the beginning of the Adjust Offset subroutine. Control will proceed to Step 124. In Step 124, the OFFSET variable will be set equal to the AVERAGE MINIMUM PERIOD variable. The THRESHOLD variable will be calculated by setting it equal to the nominal seed height multiplied by 0.1875. Control will then proceed to Step 126.

Step 126 is a decision diamond which checks the THRESHOLD variable. If the THRESHOLD value is less than a certain number (e.g., 5), then control will proceed to Step 128.

In Step 128, the THRESHOLD variable will be set equal to a certain number (e.g., 5). Control will then proceed to Step 130. Returning to Step 126, if the THRESHOLD variable is not less than a certain number (e.g., 5), then control will proceed to Step 130. Step 130 signals the end of the Adjust Offset subroutine.

Figure 21:
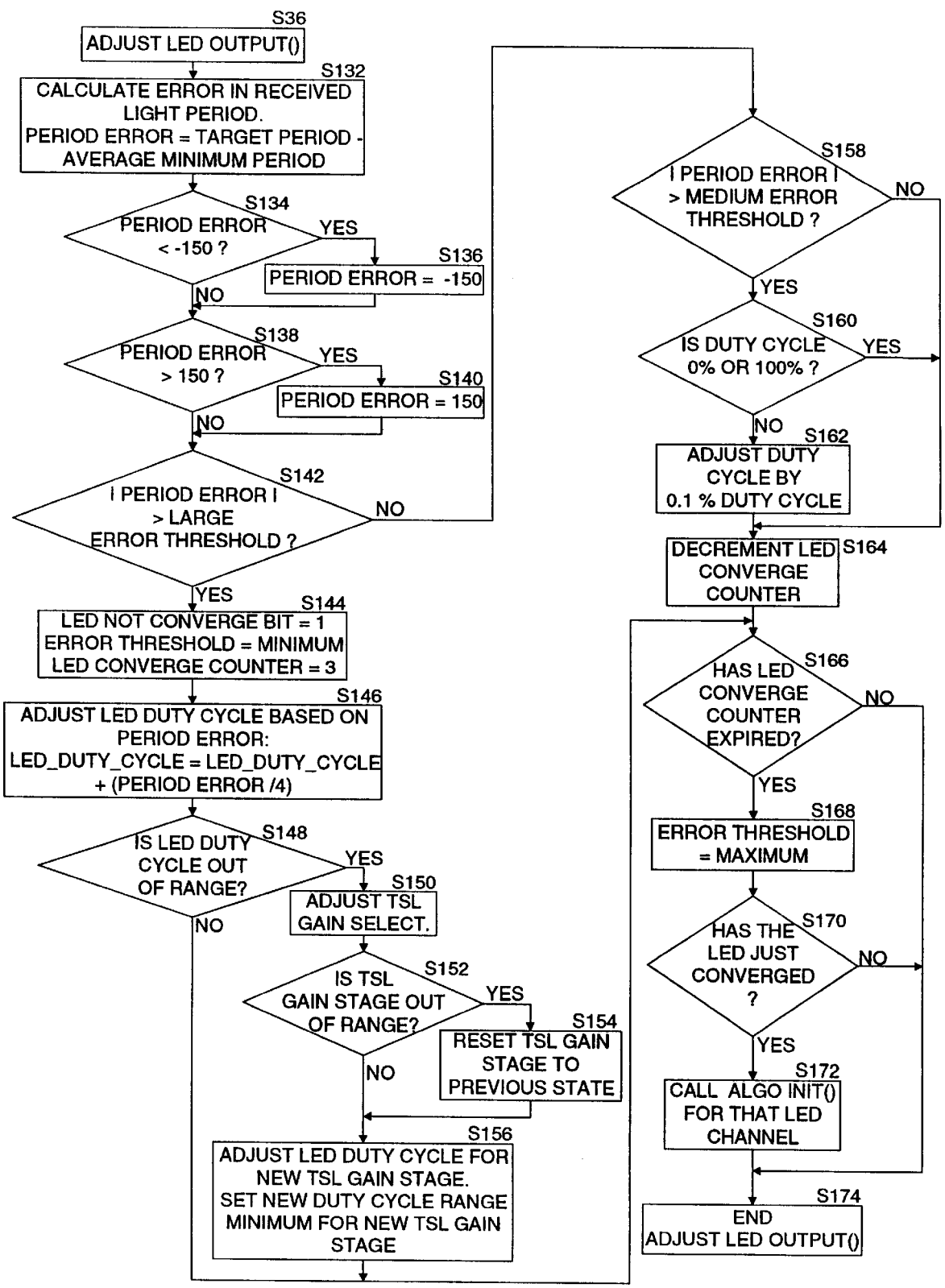

FIG. 21 is a flowchart diagram of the Adjust LED Output subroutine (Step 36, FIG. 15) necessary to maintain proper light level. Step 36 signals the beginning of the Adjust LED Output subroutine. Control will proceed to Step 132, which calculates the error in the received light period. The frequency of the signal sent to the microprocessor is proportional to the intensity of the light at the detector. The inverse of frequency is period. The variable PERIOD ERROR is calculated as TARGET PERIOD minus the AVERAGE MINIMUM PERIOD. Control will then proceed to Step 134.

Steps 134 and 138 are used to slow or "dampen" the LED control, in order to avoid unstable oscillation of the LED output. Step 134 is a decision diamond which checks if the period error is less than a certain number (e.g., –150). If this is true, then control will proceed to Step 136. In Step 136, the period error will be set to a certain number (e.g., –150). Control will then proceed to Step 138. Returning to Step 134, if the PERIOD ERROR is not less than a certain number (e.g., –150), then control proceeds to Step 138.

Step 138 is a decision diamond which checks if the PERIOD ERROR is greater than a certain number (e.g., 150). If this is true, then control will proceed to Step 140, which sets the PERIOD ERROR to a certain number (e.g., 150). Control will then proceed to Step 142. Returning to Step 138, if the PERIOD ERROR is not greater than a certain number (e.g., 150), then control will proceed to Step 142.

Step 142 is a decision diamond which checks the absolute value of the PERIOD ERROR. If the absolute value of PERIOD ERROR is greater than the large ERROR THRESHOLD value, then control will proceed to Step 144. This path will be taken if the PERIOD ERROR is grossly large or if the light intensity is too far from the desired range. In Step 144, the LED Not Converge Boolean will be set to TRUE (e.g., to 1), which indicates that the LED is not in convergence. The ERROR THRESHOLD variable will be set equal to a minimum value. The LED converge counter will be set to a certain number (e.g., 3). Control will then proceed to Step 146. In Step 146, the LED duty cycle will be updated based on a proportional control system loop. The LED duty cycle will be set equal to the LED duty cycle plus the PERIOD ERROR divided by a certain number (e.g., by 4). Control will then proceed to Step 148.

Step 148 is a decision diamond which checks whether the LED duty cycle is out of range. Out of range implies that the new desired LED duty cycle is greater than a certain maximum value or less than a certain minimum value, If the LED duty cycle is out of range, then control will proceed to Step 150. In Step 150, the TSL gain selection will be adjusted. If the LED duty cycle was out of range on the high end, meaning that the LED is not bright enough, the TSL gain select will be adjusted to a more sensitive level. If the LED duty cycle was out of range on the low end, meaning that the LED is not dim enough, the TSL gain select will be adjusted to a less sensitive level. Control will then proceed to Step 152.

Step 152 is a decision diamond which checks if the TSL gain select is out of range. If the TSL gain select is out of range, then control will proceed to Step 154. In Step 154, the TSL gain select is reset to its previous state. Control will then proceed to Step 156. Returning to Step 152, if the TSL gain select is not out of range, then control will proceed to Step 156. In Step 156, the LED duty cycle will be adjusted for its new TSL gain select. The new LED duty cycle range minimum will be set for the new TSL gain select. Control will then proceed to Step 166. Similarly, in Step 148, if the LED duty cycle is not out of range, then control will proceed to Step 166.

Returning to Step 142, if the absolute value of the PERIOD ERROR is not greater than the large ERROR THRESHOLD variable, then control will proceed to Step 158. Step 158 is a decision diamond which checks if the absolute value of the period error is greater than the medium ERROR THRESHOLD value. If this is true, then control will proceed to Step 160. Step 160 is a decision diamond which checks if the LED duty cycle is at a certain minimum or a maximum percentage (e.g., 0 or 100 percent). If the LED duty cycle is not at a certain minimum or a maximum percentage, then control will proceed to Step 162. In Step 162, the duty cycle will be adjusted by plus or minus 0.1 percent of the duty cycle, dependent upon if the period error was negative or positive. Control will then proceed to Step 164. Returning to Step 160, if the duty cycle is at a certain minimum or a maximum percentage (e.g., 0 or 100 percent), then control will proceed to Step 164.

In Step 164, the LED convergence counter will be decremented by one. Control will then proceed to Step 166, which is also where control proceeded from Step 148 and Step 156. Step 166 is a decision diamond which checks if the LED convergence counter has expired. If the LED convergence counter has expired, then control will proceed to Step 168. In Step 168, the tolerable ERROR THRESHOLD will be set equal to MAXIMUM. This serves as a hysteresis mechanism. Control will then proceed to Step 170.

Step 170 is a decision diamond which checks if the LED has just converged. If the LED has just converged (it is the first time through this procedure), then control will proceed to Step 172. In Step 172, the AlgoInit routine for a particular channel will be called. AlgoInit is a routine to initialize the count seeds and processes variables to known values, such that these variables will not be in an unknown state when the Count Seeds process begins. At this point all paths will proceed to Step 174, which signals the end of the Adjust LED Output subroutine. Control returns to the Main Loop routine (FIG. 15).

Figure 22:
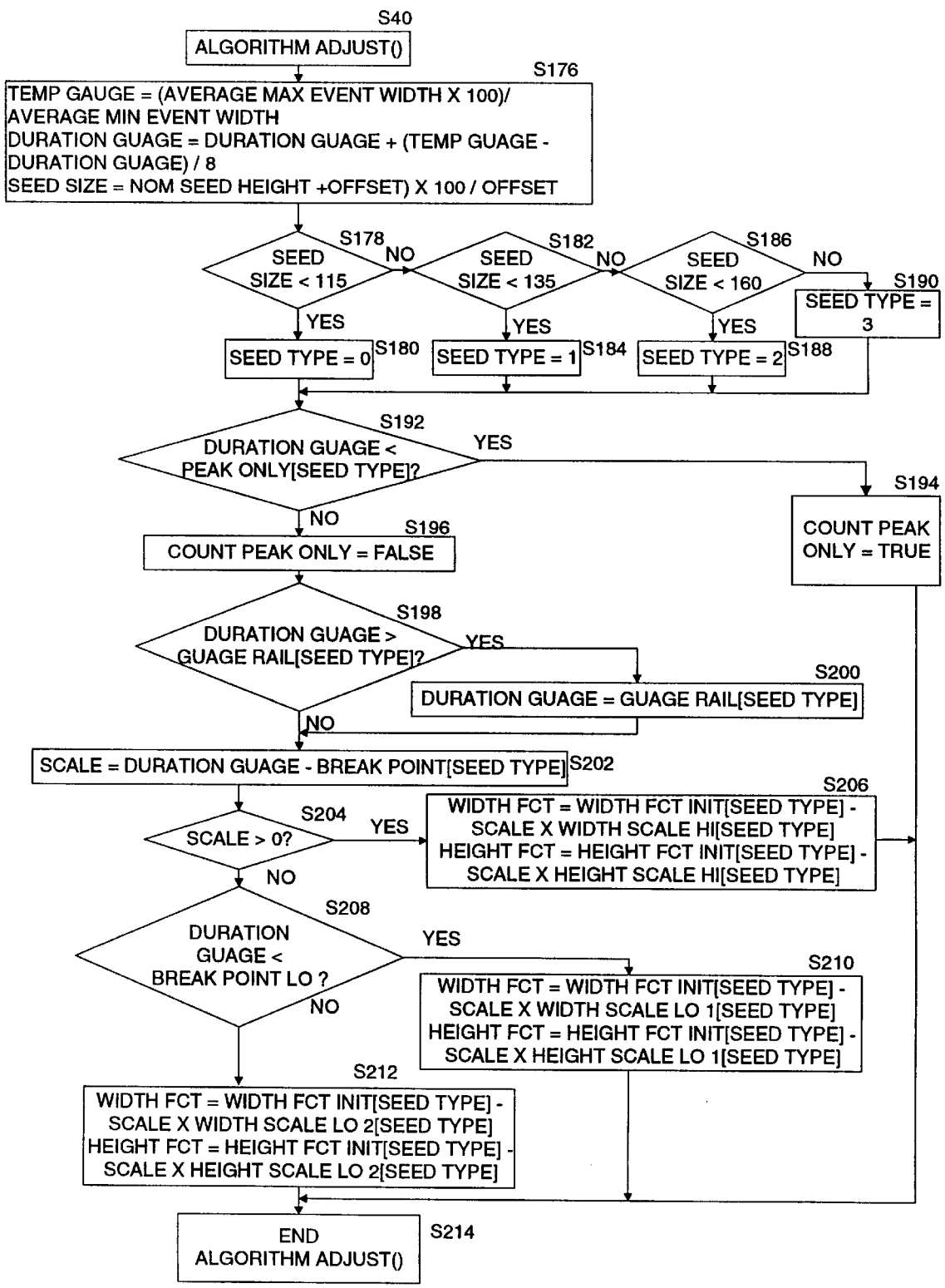

FIG. 22 is a flowchart diagram of the Algorithm Adjust subroutine (Step 40, FIG. 15). This subroutine changes the algorithm in real-time, based on existing seed conditions. Step 40 signals the beginning of the Algorithm Adjust subroutine. Control will proceed to Step 176.

In Step 176, the variable TEMP GAUGE will be calculated as being equal to 100 times the ratio (average maximum event width/the average minimum event width). TEMP GAUGE can thus be interpreted as a ratio of the maximum event width to minimum event width. TEMP GAUGE is an intermediate value. The variable DURATION GAUGE is calculated as a low-pass filter average of the value of TEMP GAUGE, as follows: DURATION GUAGE=DURATION GUAGE+(TEMP GUAGE−DURATION GUAGE)/8. The SEED SIZE variable will be calculated as follows: SEED SIZE=(NOMSEEDHEIGHT+OFFSET) times (100/OFFSET). SEED SIZE can thus be interpreted as a ratio of the nominal seed height to ambient light level. After Step 176, control will proceed to Step 178.

Step 178 is a decision diamond which begins the selection of the SEED SIZE. Given the SEED SIZE, one of four seed types will be determined (e.g., 0, 1, 2, or 3), which will be characterized according to certain Seed Type Factors, see Table I.

TABLE I

Seed Type Factors

| | Seed Type | | | |
|---|---|---|---|---|
| | 0 (tiny seeds) | 1 (small seeds) | 2 (medium seeds) | 3 (large seeds) |
| peak only | 105 | 115 | 110 | 105 |
| Guage Rail | 360 | 380 | 360 | 360 |
| WidthFctInit | 0.500 | 0.625 | 0.500 | 0.500 |
| HeightFctInit | 0.656 | 1.000 | 0.656 | 0.656 |
| WidthScaleHi | 0.688 | 0.688 | 0.688 | 0.688 |
| WidthScaleLo | 0.688 | 0.688 | 1.000 | 0.688 |
| WidthScaleLo2 | 0.313 | 0.313 | 0.313 | 0.313 |
| HeightScaleHi | 1.063 | 1.063 | 1.063 | 1.063 |
| HeightScaleLo1 | 1.52 | 1.52 | 2.500 | 1.520 |
| HeightScaleLo2 | 0.625 | 0.625 | 0.625 | 0.625 |
| BreakPoint | 212 | 212 | 212 | 212 |
| BreakPointLo | 135 | 160 | 145 | 135 |

Step 178 checks if the SEED SIZE is less than a certain number (e.g., 115). If this is true, control will proceed to Step 180. In Step 180, the Seed Type will be set equal to zero. Returning to Step 178, if the seed size is not less than a certain number (e.g., 115), then control will proceed to Step 182.

Step 182 is a decision diamond which checks if the seed size is less than a certain number (e.g., 135). If so, then control will proceed to Step 184. In Step 184, the Seed Type will be set equal to 1. Returning to Step 182, if the SEED SIZE is not less than a certain number (e.g., 135), then control will proceed to Step 186.

Step 186 is a decision diamond which checks if the seed size is less than a certain number (e.g., 160). If so, then control will proceed to Step 188. In Step 188, the seed Type will be set equal to 2. Returning to Step 186, if the seed size is not less than a certain number (e.g., 160), then control will proceed to Step 190. In Step 190, the seed Type will be set equal to 3. At this point all paths will proceed to Step 192.

Step 192 is a decision diamond which checks if the DURATION GAUGE variable is less than the PEAK ONLY variable for a certain Seed Type (e.g., 0, 1, 2, or 3). If this is true, then control will proceed to Step 194. In Step 194, the Count Peak Only Boolean will be set to TRUE. Returning to Step 192, if the DURATION GAUGE variable is not less than the PEAK ONLY variable for a certain seed type, then control will proceed to Step 196. In Step 196, the Count Peak Only Boolean will be set to FALSE and control will proceed to Step 198.

Step 198 is a decision diamond which checks if the variable DURATION GAUGE is greater than the variable GAUGE RAIL of a certain seed type. If this is true, then control will proceed to Step 200. In Step 200, the value of DURATION GAUGE will be set equal to the value or GAUGE RAIL of a certain Seed Type. Control will then proceed to Step 202. Returning to Step 198, if the variable DURATION GAUGE is less than the value of GAUGE RAIL of a certain Seed Type, then control will proceed to Step 202. In Step 202, the SCALE variable will be calculated. The SCALE variable will be set equal to DURATION GAUGE minus the value of BREAK POINT of a certain Seed Type. Control will then proceed to Step 204.

Step 204 is a decision diamond which checks if the SCALE variable is greater than zero (i.e., is it positive) If SCALE is greater than zero, then control will proceed to Step 206. In Step 206, the width and height factors (widthFct and heightFct) will be calculated using certain entries from Table I, as illustrated. Returning to Step 204, if the SCALE variable is not greater than zero, then control will proceed to Step 208.

Step 208 is a decision diamond which checks if the DURATION GAUGE variable is less than the value of BreakPointLo. If so, then control will proceed to Step 210. In Step 210, the width factor (WidthFct) and height factor (HeightFct) will be calculated using certain entries from Table I, as illustrated.

Returning to Step 208, if the DURATION GAUGE is not less than BreakpointLo (e.g., 135), then control will proceed to Step 212. In Step 212, the width factor (widthFct) and the height factor (heightFct) will be calculated using certain entries from Table I, as illustrated. At this point, all paths will proceed to Step 214, which signals the end of the Algorithm Adjust subroutine. Control will then return to the Main Loop routine (FIG. 15).

Advantages of the present invention, as compared to that of the prior art apparatuses and methods, are that it enables more accurate counting of particles flowing in the seed tubes of an air seeder than in the prior art, as a result of employing a uniform, collimated light beam in the sensing area of the seed tube. Further, it was not previously possible to accurately count seeds flowing in the primary seed tubes of an air seeder. The present invention thus enables a count of all the seeds dispensed by the secondary seed tubes of an air seeder to be determined from monitoring the flow of seeds in each of the primary seed tubes of the air seeder and summing the results over a given time interval. This greatly reduces the number of sensor channels that are needed, as well as the number of sensors and memory storage locations as compared to the prior art, which suggests only the monitoring of particles flowing in the secondary seed tubes of an air seeder to determine the overall seeding rate of the air seeder. By employing components of the monitoring apparatus at the seed sensing areas which contain no electronic components, and indeed, which are connected to remotely positioned electronic components only by electrically non-conductive optical fibers, malfunctioning of the apparatus due to static discharge resulting from charge build-up from seeds flowing through plastic seed tubes at a high velocity is avoided.

The methods described above for analyzing the light from the sensing area so as to detect and count particles dispensed by the seed monitoring system 36 are applicable for use with either a primary sensor 360 or a secondary sensor 362 in the air seeding system 322. The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A computer-implemented method of monitoring particle flow through an air driven particle dispensing system said method comprising the steps of:

dispensing particles through at least one particle tube from a hopper;

dispensing a flow of particles from said at least one particle tube into a plurality of secondary particle tubes which are smaller in area than said particle tube under air pressure from a tank;

providing a particle sensor positioned at each said at least one particle tube so as to detect particle flow through each particle tube, each said particle sensor including at least one emitter lens body which directs an optical beam to a sensing area;

analyzing transient reductions in the light from an emitter that passes through the sensing area of each sensor, said transient reductions being caused as each particle momentarily blocks light from the emitter lens body as the particles pass through said optical beam in the sensing area, so as to determine a count of the number of particles flowing through the associated particle tube, wherein the particles are seeds and a computer-implemented algorithm sets criteria for categorizing whether a seed event has occurred, and wherein said computer-implemented algorithm adjusts itself automatically during successive time periods to account for variations in seed size based on a detected running average percentage reduction of the light from the sensing area as caused by the passage of seeds through the sensing area.

2. The method of monitoring particle flow as set forth in claim 1, wherein said computer-implemented algorithm also adjusts itself automatically during said successive time periods to account for variations in seed delivery rate based on a running average of the ratio of a maximum event width to a mium event width over a given number of samples.

3. In a computer-implemented method of monitoring particle flow by forming a light beam that transits a sensing area, passing particles through the sensing area, and monitoring the output of a detector as a function of time as the particles pass the sensing area between the light beam source and the detector, thereby causing the light in the light beam to be partially obscured as one or more particles pass through the sensing area, said detector of a type having an output that is adjustable for a given input by adjusting the gain of the detector, the improvement of compensating for the accumulation of dirt, dust and various chemicals that may accumulate on optical components which shape the light beam and which direct the light beam to the detector by:

(a) first, adjusting the intensity of the light source until such time as the output of the detector is within a specified range, or until an indicia of the intensity of the light beam reaches a specified value, (b) if, after step (a), the output of the detector is not within the specified range, incrementally adjusting the gain of the detector, and (c) if after step (b), if the output of the detector is not within the specified range, looping back once more to step (a) and repeating the process until either the detector output is within the specified range, or until the detector is set for maximum gain.

* * * * *

UNITED STATES PATENT AND TRADEMARK OFFICE
CERTIFICATE OF CORRECTION

PATENT NO : 6,093,926
DATED : Jul.25, 2000
INVENTOR(S): Mertins et al

It is certified that error appears in the above-identified patent and that said Letters Patent are hereby corrected as shown below:

In claim 1, at line 2, after "system" insert a comma.

Signed and Sealed this

Twenty-fourth Day of April, 2001

Attest:

NICHOLAS P. GODICI

Attesting Officer

Acting Director of the United States Patent and Trademark Office